United States Patent [19]
Eyman et al.

[11] Patent Number: 5,522,614
[45] Date of Patent: Jun. 4, 1996

[54] MULTI-PURPOSE COLLAPSIBLE INFANT STROLLER

[75] Inventors: David N. Eyman, Cincinnati, Ohio; Thomas J. Schmidlin, Tuscon, Ariz.; Jennifer A. Kelley, Cincinnati, Ohio

[73] Assignee: TRI Industries, Inc., Bloomington, Minn.

[21] Appl. No.: 154,431

[22] Filed: Nov. 18, 1993

Related U.S. Application Data

[63] Continuation-in-part of Ser. No. 30,703, Mar. 12, 1993, Pat. No. 3,356,171.

[51] Int. Cl.$^6$ .................................................. B62B 7/06
[52] U.S. Cl. ........................ 280/642; 280/650; 280/658
[58] Field of Search .......................... 280/38, 641, 642, 280/647, 650, 657, 658

[56] References Cited

U.S. PATENT DOCUMENTS

| | | |
|---|---|---|
| D. 204,254 | 4/1966 | Cerf . |
| D. 206,116 | 11/1966 | Hughes . |
| D. 274,714 | 7/1984 | Cone . |
| D. 290,825 | 4/1987 | Mathies et al. . |
| D. 297,525 | 9/1988 | Baechler . |
| D. 301,850 | 6/1989 | Clement et al. . |
| D. 315,885 | 4/1991 | Jacobs . |
| 699,186 | 5/1902 | Katzke . |
| 716,972 | 12/1902 | Whitmore . |
| 2,425,688 | 8/1947 | Schulte . |
| 2,455,119 | 11/1948 | Hall . |
| 2,781,225 | 2/1957 | Heideman . |
| 3,052,480 | 9/1962 | Sanstrom . |
| 3,110,504 | 12/1963 | Myers . |
| 3,305,244 | 2/1967 | Flagg . |
| 3,403,744 | 10/1968 | Dinkel . |
| 3,575,461 | 4/1971 | Goldman et al. . |
| 3,605,929 | 9/1971 | Rolland . |
| 3,656,777 | 4/1972 | Keiser, Jr. . |
| 3,698,502 | 10/1972 | Patin . |
| 3,712,636 | 1/1973 | Gesslein . |
| 3,781,931 | 12/1973 | Patin . |
| 3,848,890 | 11/1974 | MacAlpine . |
| 3,873,116 | 3/1975 | Perego . |
| 3,877,723 | 4/1975 | Fahey et al. . |
| 3,909,043 | 9/1975 | Black . |
| 4,029,329 | 6/1977 | Chambers . |
| 4,064,957 | 12/1977 | Parham . |
| 4,072,318 | 2/1978 | Laune . |
| 4,166,630 | 9/1979 | Sullivan et al. . |
| 4,181,317 | 1/1980 | Toda . |

(List continued on next page.)

FOREIGN PATENT DOCUMENTS

| | | |
|---|---|---|
| 2579544 | 10/1986 | France . |
| 213538 | 9/1909 | Germany . |
| 2348716 | 7/1974 | Germany . |
| 2741543 | 6/1978 | Germany . |
| 851163 | 10/1960 | United Kingdom . |
| 2099765 | 12/1982 | United Kingdom . |
| 2204282 | 11/1988 | United Kingdom . |

(List continued on next page.)

*Primary Examiner*—Richard M. Camby
*Attorney, Agent, or Firm*—Palmatier, Sjoquist & Helget

[57] ABSTRACT

A collapsible infant stroller that has an elevated contractible lower frame portion having a rear end, an intermediate portion and a front end. A contractible upper frame portion is provided with a lower end pivotally attached to the lower frame portion and extending downwardly therefrom and supporting two front wheel assemblies, an intermediate seat portion supporting a flexible infant seat and an upper handle end. A stabilizer strut is connected to the lower frame portion and the upper frame portion to secure the frame portions together for safe and smooth carrying of an infant. A rear strut pivotally connects the upper frame portion and the lower frame portion and extends downwardly from the lower frame portion for supporting rear wheel assemblies. A releasable locking catch secures the stroller in its upright erect position for use, and when released, permits contraction of the upper and lower frame portions inwardly upon themselves as to move the stroller to a collapsed condition for transportation and storage.

40 Claims, 19 Drawing Sheets

U.S. PATENT DOCUMENTS

| | | |
|---|---|---|
| 4,325,449 | 4/1982 | D-Addio et al. . |
| 4,335,900 | 6/1982 | Fleischer . |
| 4,346,912 | 8/1982 | Habib . |
| 4,353,567 | 10/1982 | Weldy . |
| 4,361,338 | 11/1982 | Kuchenbecker et al. . |
| 4,369,987 | 1/1983 | Witherell . |
| 4,373,740 | 2/1983 | Hendrix . |
| 4,403,673 | 9/1983 | Ball . |
| 4,408,776 | 10/1983 | Randolph et al. . |
| 4,422,663 | 12/1983 | Hon . |
| 4,526,390 | 7/1985 | Slolnik . |
| 4,542,915 | 9/1985 | Wheeler, III et al. . |
| 4,586,721 | 5/1986 | Harada et al. . |
| 4,618,184 | 10/1986 | Harvey . |
| 4,632,420 | 12/1986 | Miyagi . |
| 4,741,551 | 5/1988 | Perego ................... 280/642 |
| 4,756,541 | 7/1988 | Albitre . |
| 4,831,689 | 5/1989 | Lo ........................ 280/658 |
| 4,902,027 | 2/1990 | Skelly . |
| 4,934,728 | 6/1990 | Chen . |
| 4,953,880 | 9/1990 | Sudakoff et al. . |
| 5,029,891 | 7/1991 | Jacobs . |
| 5,039,120 | 8/1991 | Stowe . |
| 5,076,599 | 12/1991 | Lockett et al. . |
| 5,123,670 | 6/1992 | Chen . |
| 5,176,395 | 1/1993 | Garforth-Bles . |
| 5,257,799 | 11/1993 | Cone et al. ............. 280/642 |

MULTI-PURPOSE COLLAPSIBLE INFANT STROLLER

This application is a continuation-in-part of co-owned U.S. patent application Ser. No. 08/030,703, filed on Mar. 12, 1993, now U.S. Pat. No. 5,356,171.

BACKGROUND OF THE INVENTION

This invention relates generally to wheeled infant strollers or carriers, and more particularly, to a conveniently portable collapsible jogging infant stroller for safely and smoothly carrying an infant which is also uniquely adapted to collapse for storage and transportation into a size less than two of its dimensions when upright and erect for use.

Collapsible or foldable baby carriages for walking have long been known and are generally described in U.S. Pat. Nos. 2,781,225; 3,873,116; and 4,072,318. These early carriages have evolved from more cumbersome, rigid carriages, as many carriages are now collapsible or foldable as to make them conveniently transported or stored.

The problems associated with known collapsible or foldable baby carriages or strollers are well known. For such strollers to be safe and permit smooth carrying of an infant, they must be secured together readily safely, such as with the use of bolts and nuts. Consequently, the disassembly of such strollers is required, necessitating the use of tools to break the stroller partially down to permit collapse or folding. Furthermore, many of these carriages or infant strollers, when in their collapsed or folded state, have one or two of their three dimensions actually extended to a longer length, height or width than when the strollers are erect. This extensibility or expansion of one or two dimensions however has been acceptable as the strollers were at least able to fit into trunks of automobiles and the like which permitted four elongated folded frames.

With the resurgence of physical fitness, persons of all ages, including the parents of infants and young children, have developed great interest in all forms of physical exercise, particularly in jogging and walking at relatively high speeds. Consequently, infant jogging strollers or carriages that fold for transport and/or storage, while yet provide for safe, stable and secure carrying of a child at a relatively higher speed were developed. Several of these infant jogging strollers are shown in U.S. Pat. Nos. Des. 297,525; 4,934,728; 4,953,880; Des. 315,885; and 5,029,891. However, these jogging strollers are also plagued with the problem of frame elongation upon collapse or folding for transportation and/or storage.

There is a continued need for a collapsible or foldable infant jogging stroller which includes all the past known refinements, but further includes the ability to fold or collapse into a contracted condition for transportation and storage wherein two of its three dimensions are less in the collapsed state as opposed to the erect state, while the third dimension remains substantially the same.

SUMMARY OF THE INVENTION

A collapsible infant stroller that has an elevated contractible lower frame portion having a rear end, an intermediate portion and a front end. A contractible upper frame portion is provided with a lower end pivotally attached to the lower frame portion and extending downwardly therefrom and supporting two front wheel assemblies, an intermediate seat portion supporting a flexible infant seat and an upper handle end. A stabilizer strut is connected to the lower frame portion and the upper frame portion to secure the frame portions together for safe and smooth carrying of an infant. A rear strut pivotally connects the upper frame portion and the lower frame portion and extends downwardly from the lower frame portion for supporting rear wheel assemblies. A releasable locking means secures the stroller in its upright erect position for use, and when released, permits contraction of the upper and lower frame portions inwardly upon themselves as to move the stroller to a collapsed condition for transportation and storage.

A principal object and advantage of the present stroller invention is its multi-purpose use to include that of a conventional stroller, a stroller for rough terrain and a stroller for jogging.

Another object and advantage of the present invention is that its lower frame portion is elevated above the ground higher than prior known strollers as to give the present invention a higher clearance for rough terrain.

Another object and advantage of the present invention is that it has a four position wheel base which adds to the stability of the stroller for moving at higher speeds where previous strollers were typically of a triangular based design for jogging.

Another object and advantage of the present invention is that the wheel assemblies of the stroller each have spring suspension to smooth the ride for the infant within the stroller over rough terrain and the like.

Another object and advantage of the present invention is that the flexible seat portion of the present invention has expandable side walls and an adjustable back rest to permit a variety of seat positions to permit the infant to assume the sitting or laying down position.

Another object and advantage of the present invention is its additional storage capacities for accessories and articles heretofore not known.

Another object and advantage of the present invention is its unique foot actuated parking brake for securely locking the stroller in place when unattended.

Another principal object and advantage of the present invention is that the jogging infant stroller collapses or folds downwardly and inwardly upon itself to actually shorten its length and height while the width remains the same when the locking means is released and the stroller is moved into its collapsed condition for transportation and storage.

Another object and advantage of the present invention is that the collapsible jogging infant stroller is easily collapsible and erectable without the need for tools.

Another object and advantage of the present invention is that the stroller collapses without the need for disassembly of any part, subpart or component, thereby eliminating the fear of losing any required pieces for the stroller to operate safely and smoothly in its erect condition for use.

Another principal object and advantage of the present invention is that its unique contractible upper and lower frame portions together with two struts comprise the unique collapsible jogging infant stroller that collapsed to a size smaller than its length and height when erect with a minimal number of parts as heretofore not known.

Further objects, features and advantages of the present invention will become understood with reference to the following specification, the appended drawings and the claims.

DETAILED SPECIFICATION

Figure 1:
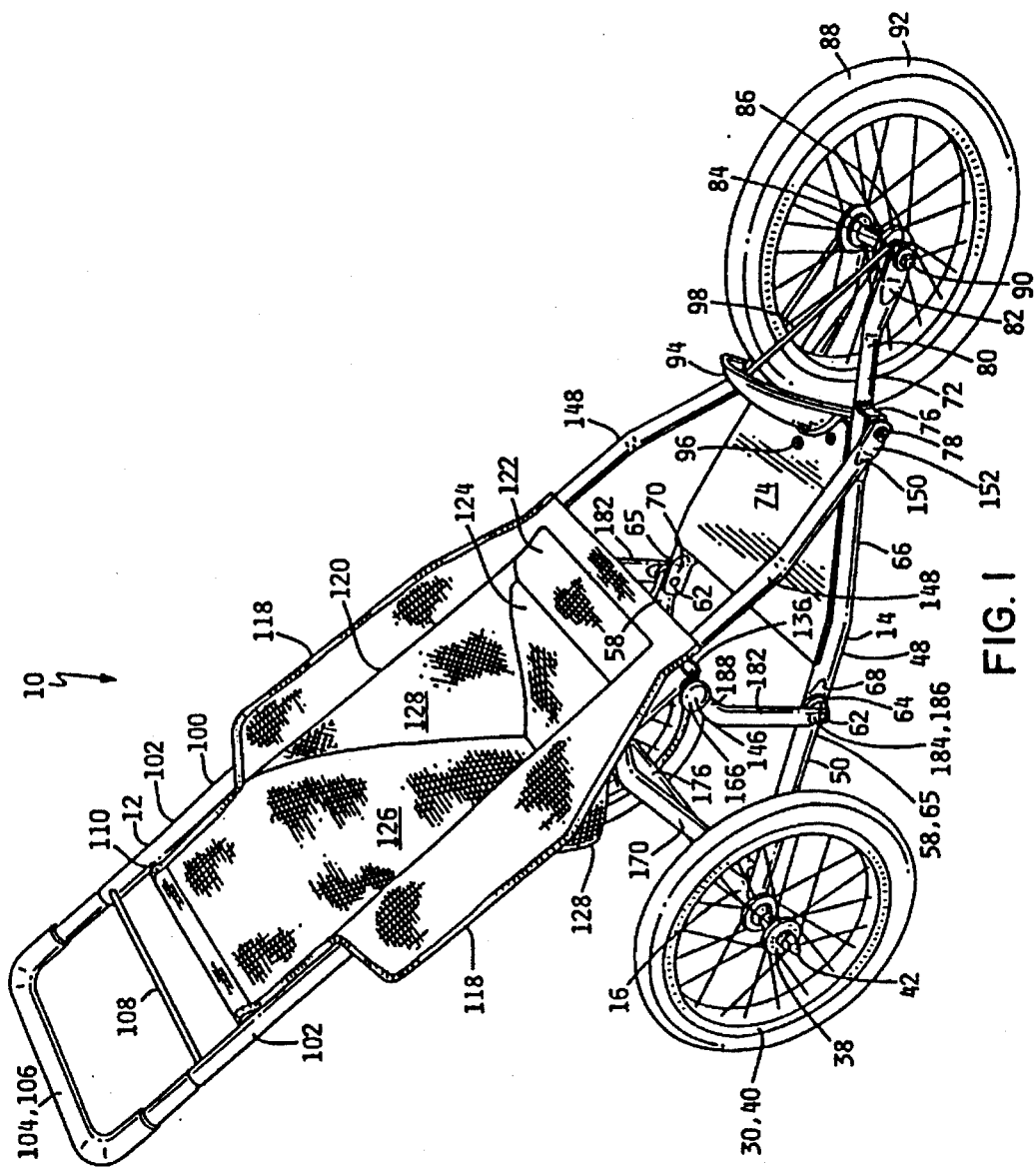
FIG. 1 is a perspective view of the infant stroller in its upright fully assembled erect condition for use.

The collapsible jogging infant stroller 10 in its upright erect condition may generally be seen in FIGS. 1–10. The stroller 10 is comprised of a tubular frame 12 having a lower frame portion 14 supporting rear wheels 40 and front wheel 92 and an upper frame portion 100 supporting a flexible infant holder 122. The lower and upper frame portions 14 and 100 each have intermediate frame portions 65 and 120 whereat the respective lower and upper frame portions 14 and 100 contract and fold upon themselves. Struts 170 and 182 support the stroller 10 in its upright usable condition and assist in simultaneously contracting the lower and upper frame portions 14 and 100 with the release of the locking means 166 and movement of the handle end 104 forwardly.

Specifically referring to FIGS. 1–4, the contractible lower frame portion, which is substantially parallel to the ground G, will be appreciated. The rear end 16 of lower frame portion 14 comprises a cross member 18 which has a hollow interior 20 specifically shown in FIG. 4. A press fit bushing 22 is inserted into interior 20 and has a central threaded aperture 24 therethrough. Bushing 22 also has a shoulder 26 to assure proper and adequate inserting of the bushing 22 into the hollow interior of cross member 18 until the shoulder 26 abuts cross member 18. The outside of bushing 22 has a serrated lock nut surface as will be appreciated.

Rear wheel assemblies 30 are each comprised of a threaded shaft 32 with a spacer portion 34 extending from wheel axle and bearing assembly 36 which supports a wheel hub 38 upon which is secured suitably by spokes wheel 40. On the other side of axle bearing assembly 36 on the threaded shaft 32 is located a cap nut 42 for turning threaded shaft 32 into bushing 22 after lock nut 44 has been threaded onto shaft 32. By this arrangement, cap nut 42 is rotated clockwise with a wrench until lock nut 44 securely abuts and is frictionally held against serrated lock nut surface 28 afterwhich the securement of the rear wheel assemblies 30 to the rear end 16 of the lower frame portion 14 is complete.

Extending forwardly from the rear end 16 are contractible converging side rails or legs 48 of the lower frame portion 14 as more clearly shown in FIGS. 1–6. Side rails 48 are comprised of rear links 50 which extend forwardly from their weldment to the rear end 16. Each rear opposing link 50 has a rear end 52, as stated, which appropriately is welded to cross member 18 of rear end 16. Just forward of the rear end 52 is located a pivot pin, rivet, bolt or the like 54 which supports a nylon washer 56 on the inside of link 50. Link 50 also has a forward end 58 which is flattened to form a tongue, tab or ear 60 with an aperture therethrough. Pivot pin, rivet, bolt or the like 54 extends through the aperture of tongue 60 and supports a nylon washer on the outside of the tongue 60. This is considered the intermediate lower frame portion 65.

The contractible lower frame portion 14 also is comprised of opposing forward links 66 each of which have a flattened rear end 68 forming a tongue, tab or ear 70 with an aperture therethrough pivotally captured by pin 62 whereat the rear links 50 and forward links 66 are pivotally joined. Forward links 66 each have converging forward ends 72 and appropriately support a step plat 74 suitably by welding the plate 74's underside to the converging forward links 66. Suitably the step plate has a non-slip surface such as by coating, corrugation or dimpling.

As the forward ends 72 converge, each supports an upper frame pivot mounting bracket 76 with an aperture and pivot pin, rivet or the like 78 therethrough. Front fork ends 80 form a fork 82 whereat the converging forward ends 72 are flattened to form tongues, tabs or ears 84 suitably with slots 86 therein.

The front wheel assembly 88 has a threaded axle bearing and nut arrangement 90 which supports a wheel 92. The front wheel assembly 88 may also be a "drop out axle" as is commonly known as the threaded axle 90 is guided and secured into slots 86 of fork 82. Extending upwardly and forwardly from the step plate 74 is a wraparound fender 94 which is appropriately bolted or screwed perhaps with nuts 96 to the step plate 74. Fender brackets 98 also may support fender 94 as they are secured about threaded axle 90.

Referring to FIGS. 1 and 2, 5 and 6, and 8 through 10, the contractible upper frame portion 100 of the collapsible jogging infant stroller 10 may be appreciated. The upper frame portion 100 is generally of an inverted U-shape. It is comprised of upper links 102 and a U-shaped handle end 104 which appropriately supports a foam rubber-like grip 106. The upper links 102 extend downwardly and forwardly when the stroller 10 is in its upright condition. Awning or canopy support rod 108 is spring loaded and suitably connects the upper links 102. Cross connecting seat bar 110 is appropriately welded between upper links 102.

Figure 7:
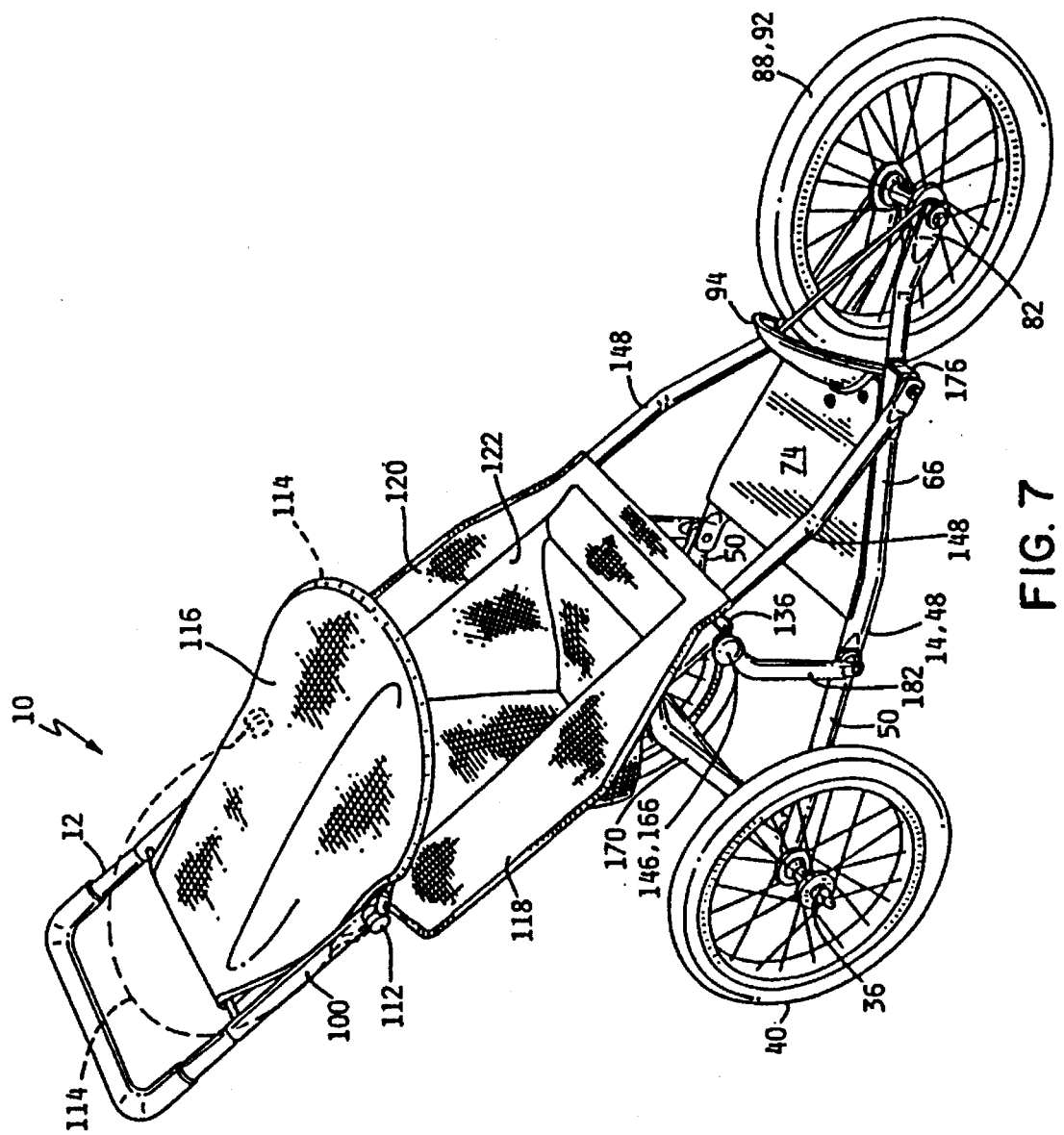
FIG. 7 is a perspective view of the infant stroller in its upright condition similar to FIG. 1 with the addition of the rotatable awning bracket, awning frame and flexible awning or canopy with its folded condition shown in broken outline.
Figure 9:
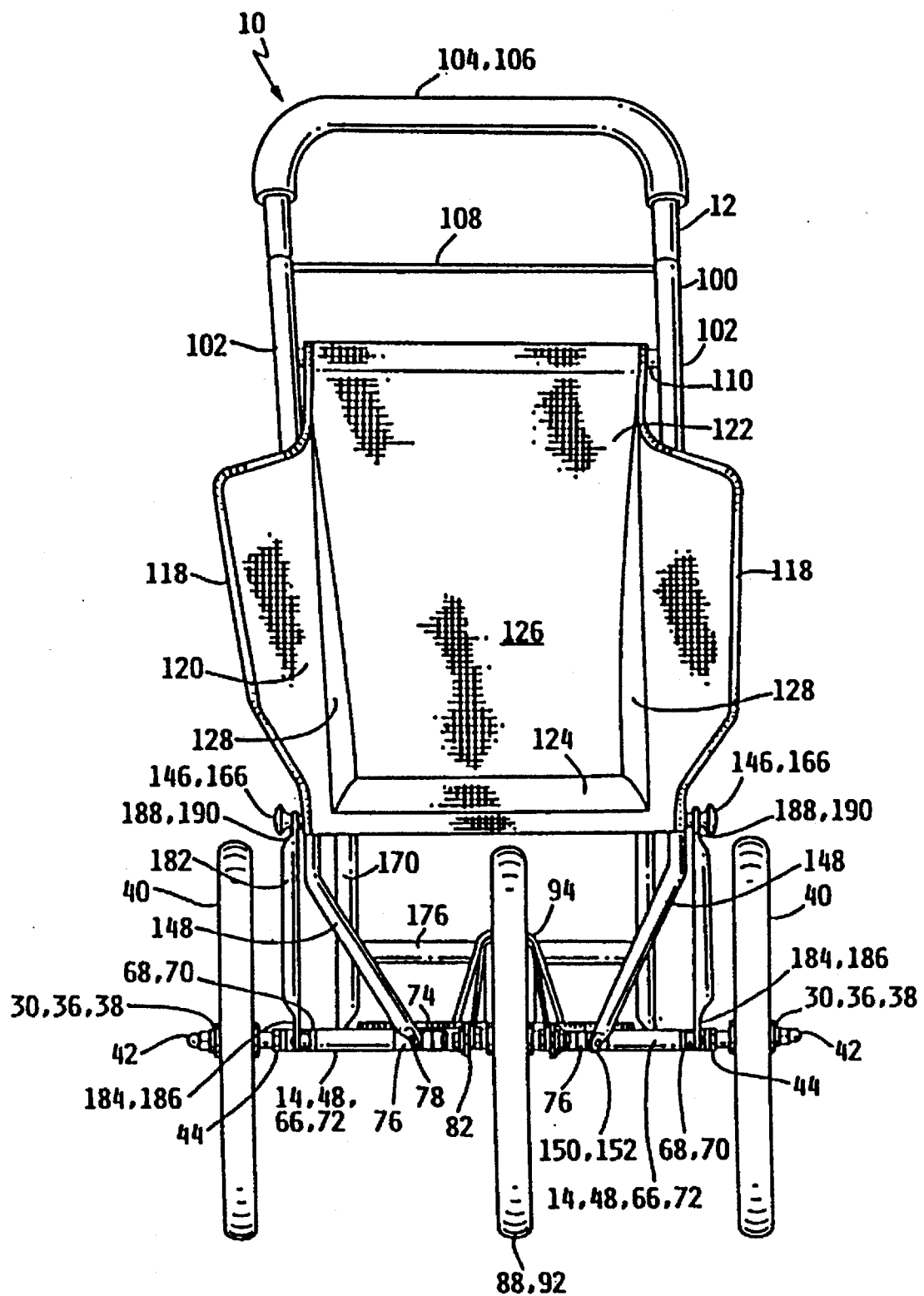
FIG. 9 is a front elevational view of the infant stroller in its upright fully assembled condition for use.
Figure 10:
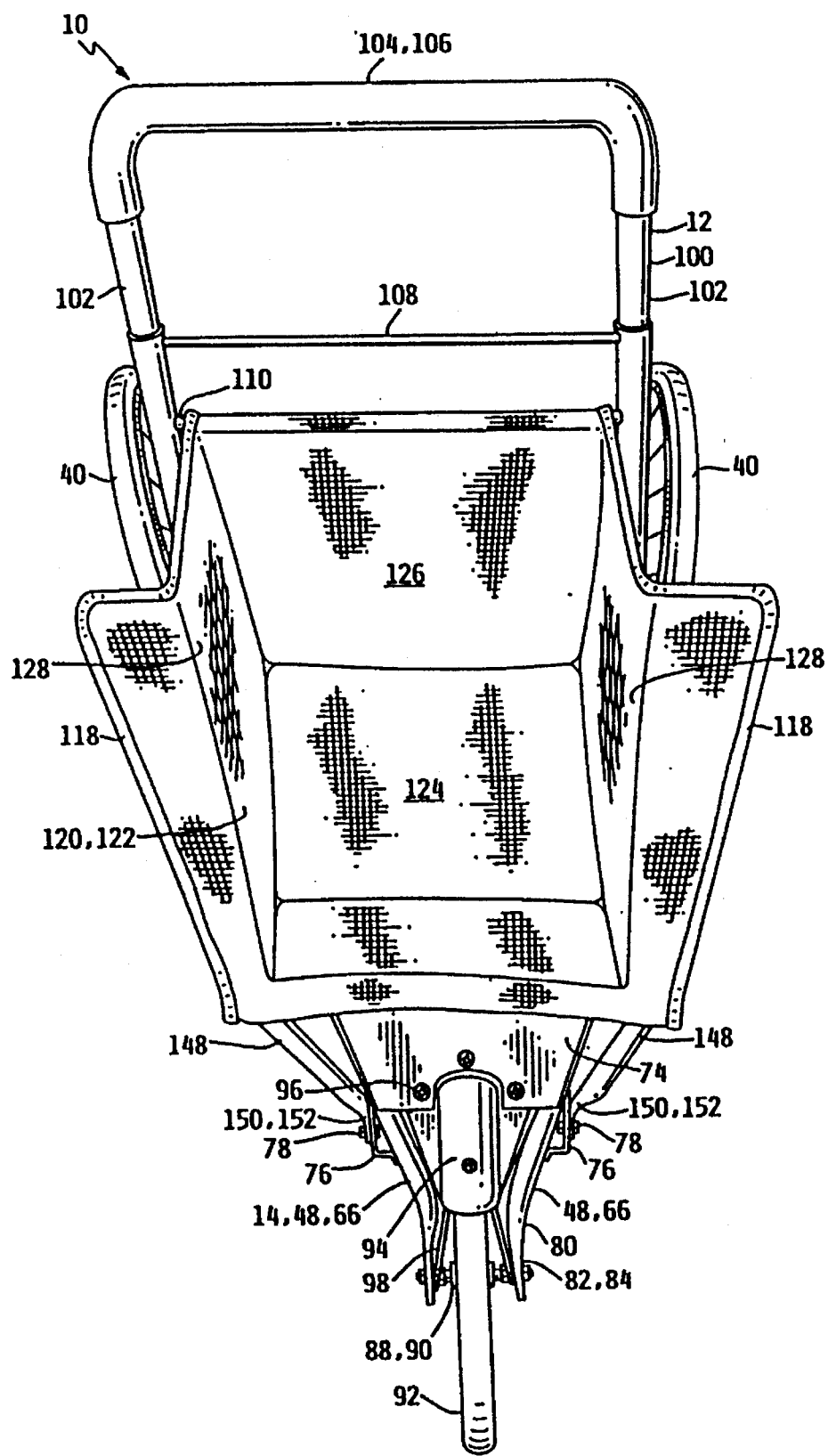
FIG. 10 is a top plan view of the infant stroller in its upright fully assembled condition for use.
Figure 11:
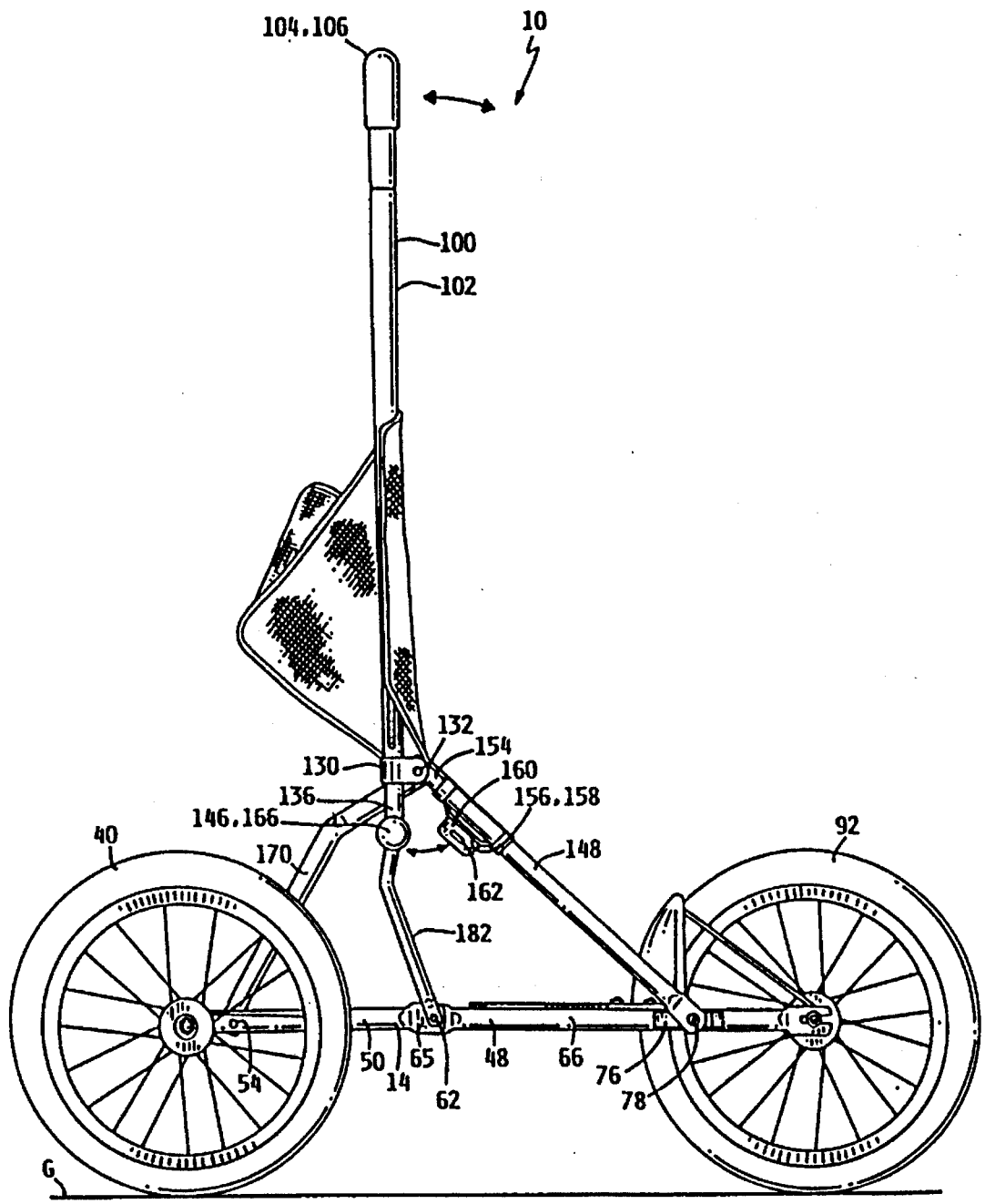
FIG. 11 is a side elevational view of the infant stroller beginning to collapse, or alternatively, approaching its fully upright condition.
Figure 12:
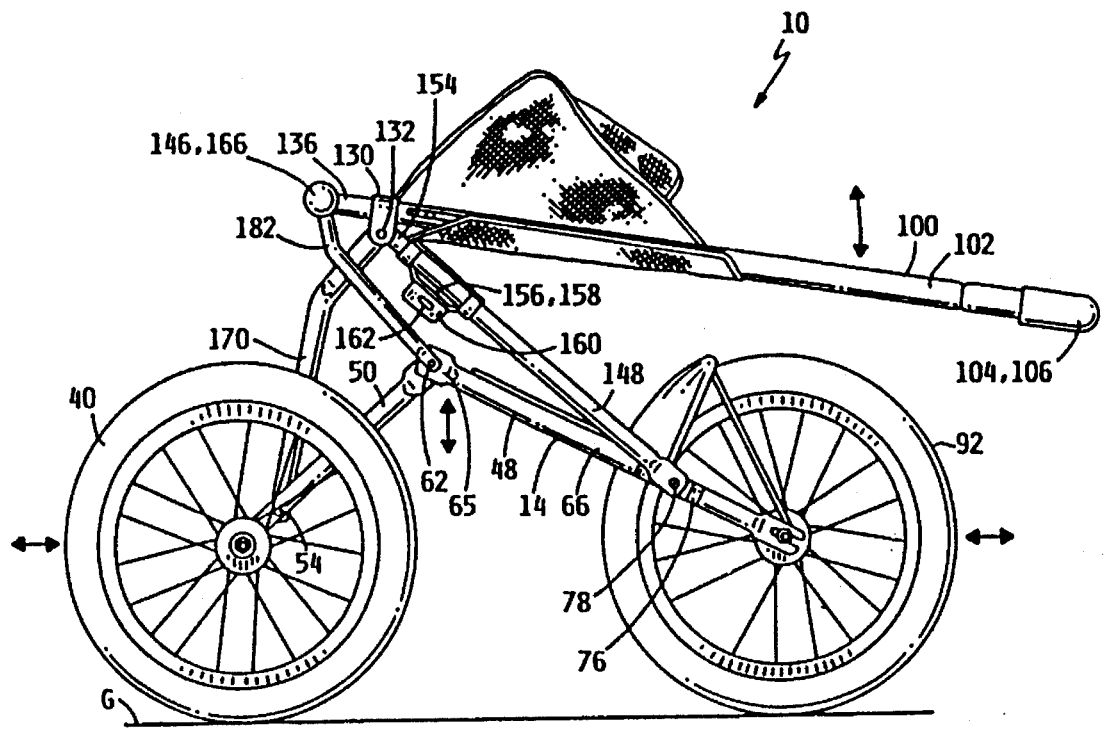
FIG. 12 is a side elevational view of the infant stroller further being moved and contracted to its collapsed condition from FIG. 11, or alternatively being lifted from its fully collapsed condition of FIG. 13 and being moved to its upright fully erect condition of first FIG. 11 and later FIG. 2.

Specifically referring to FIG. 7, a rotatable awning bracket is suitably affixed on the outside of each upper link 102 just below the seat bar 110. The awning bracket is suitably of a ratchet-type from which extends an awning frame 114 which suitably supports a flexible awning 116 or canopy. With the ratchet-type rotatable awning bracket 112 securable in a variety of positions, the awning frame 114 and the flexible awning or canopy 116 may be lowered as to provide overhead protection to the infant or child or be folded back and upwardly to lay along the upper link 102 for easy collapsing or folding of the stroller 10, as will be appreciated.

Wing-like safety fenders or arm rest supports 118 are located generally at the intermediate seat portion 120 of the upper frame portion 100. The wing-like supports 118 and the crossconnecting seat bar 110 appropriately permit the draping of the flexible infant holder 122 thereover. Infant holder 122 is appropriately made of a flexible, soft fabric-like seat material. Holder 122 forms a seat 124, backrest 126 and sidewalls 128. Optionally, a seat belt arrangement may be secured in the infant holder 122 as would be appreciated.

Referring to FIGS. 2, 5, 6, 8 and 11 through 13, the releasably locking relationship of the upper links 102 together with the lower converging links 148 may be appreciated. Each upper link 102 appropriately supports a lower link pivot mounting bracket 130 suitably by welding thereat. Bracket 130 has a pivot pin, rivet or the like 132 passing therethrough and supporting a nylon washer 134 on the inward side of bracket 130 as will be appreciated. Just below bracket 130 is located the lower end 136 of upper links 102. The lower end 136 of each upper link 102 has an aperture 138 therethrough wherein a biased lock pin 140 is located and captured thereat by a press fit retaining washer which further secures a spring 144 within the lower end 136. Directed outwardly of the stroller 10 is located a handle 146 grippable by a human hand and extending from the biased locking pin on each side of the stroller 10.

The lower converging links 148 of the upper frame portion 100 may be appreciated by viewing FIGS. 1, 2, 5, 6 and 8. The lower converging links 148 have lower ends 150 which are compressed together thereby forming tongues, tabs or ears 152 with apertures therethrough. The tongues 152 suitably are flush mounted to upper frame pivot mounting bracket 76 and pivot pins or rivets 78 secure the tongues 152 of the lower converging links thereat as they pass through their respective apertures and are secured thereat.

The lower converging links 148 each have an upper end 154 with an upper link support and securing bracket 156 on their lower side. The distal end of the upper end 154 has an aperture therethrough and is suitably captured by the pivot pin or rivet 132 passing through the lower link pivot mounting bracket 130 as to pivotally connect the upper and lower links 102 and 148 of the upper frame portion 100. The underside of the support and securing brackets 156 each suitably have a rest or support surface 158 upon which the lower ends 136 of the upper links 102 securably rest and are aligned thereat by means of alignment tab 160 as the upper frame portion 100 is moved from its contracted condition to its erect condition. A locking aperture or slot 162 is located in alignment tab 160 and suitably receives the biased locking pin 140.

Referring to FIGS. 1 through 6, the operation and benefits of rear strut 70 will be appreciated. Strut 170 has lower ends 172 which are compressed to form tongue, tabs or ears 174 with an aperture therethrough for suitably capturing the tabs 174 with pivot pin or rivet 54 with nylon washer 56 therebetween. Rear strut 170 has a cross member 176 and upper ends 178 which are also suitably flattened to form tongue, tab or ears 180 with apertures therethrough for abutment to the inside of nylon washers 134 and pivotally held thereat by pivot pin or rivet 132.

Referring to FIGS. 1, 2, 5, 6, 8 and 9, the frame stabilizer struts 182 are located on each side of the stroller 10 and extend between the upper frame and lower frame portions 100 and 14. The stabilizer struts each have a lower end 184 which is compressed to form tongue 186 with apertures therethrough for securement of the lower end to pivot pin or rivet 62 as the tongue 186 abuts against the nylon washer 64. The upper end 88 of each stabilizer strut 182 is also compressed to form a tongue 190 with an aperture therethrough for securement to the outside of the lower end 136 of one upper link 102 of the upper frame portion 100 suitably by biased locking pin 140.

Referring specifically to FIGS. 1–2, 8, and 11–13, the releasable locking means 166 between the upper and lower frame portions 100 and 14 will be appreciated. The lower link pivot mounting brackets 130 are each secured to the upper frame portion upper links 102 and pivotally capture the upper ends 154 of the lower converging links 148 together with the upper ends 178 of rear strut 170. The lower end 136 of each upper link 102 appropriately has the biased locking pin 140 extending therethrough with handle 148 fixed to the pin 140 and extending outwardly. As the locking pin 140 is biased to extend through and inwardly of the lower ends 136, the pin 140 is interlockable with the locking slot 162 of the alignment tab 160 extending downwardly from the support and securing bracket 156.

By this arrangement, the biased locking pin 140 releasably secures the upper and lower links 102 and 148 of the upper frame portion 100 securely together with the assistance of brackets 130 and 156. The stabilizer strut 182 extends downwardly from the locking pin 140 and securely holds the rear and forward links 50 and 66 of the lower frame portion 14 substantially parallel to the ground. Further support for the stroller in its upright condition is gained by the pivotally connected rear strut between the upper and lower frame portions 100 and 14.

Figure 2:
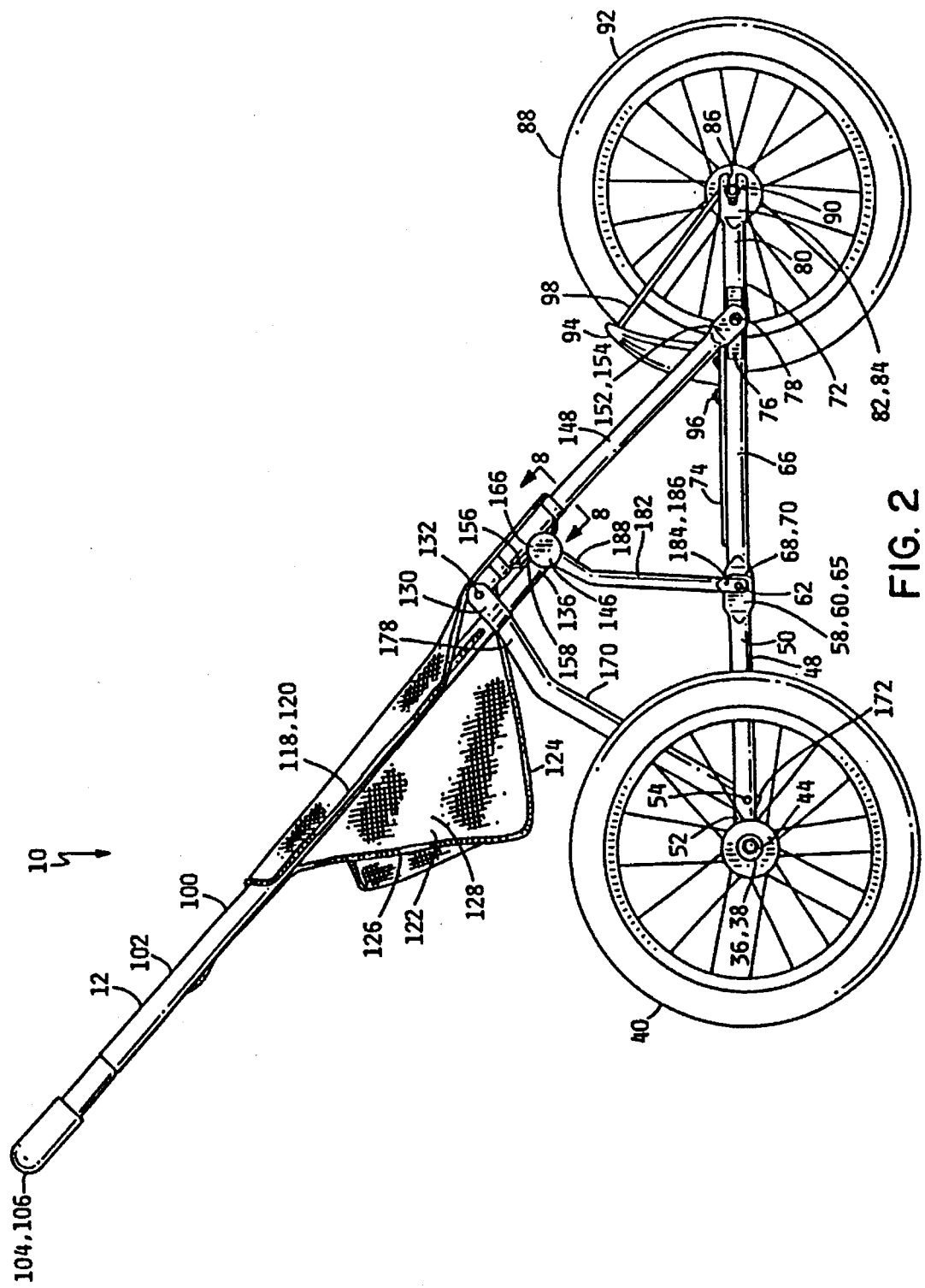
FIG. 2 is a side elevational view of the infant stroller in its upright fully assembled condition for use.
Figure 3:
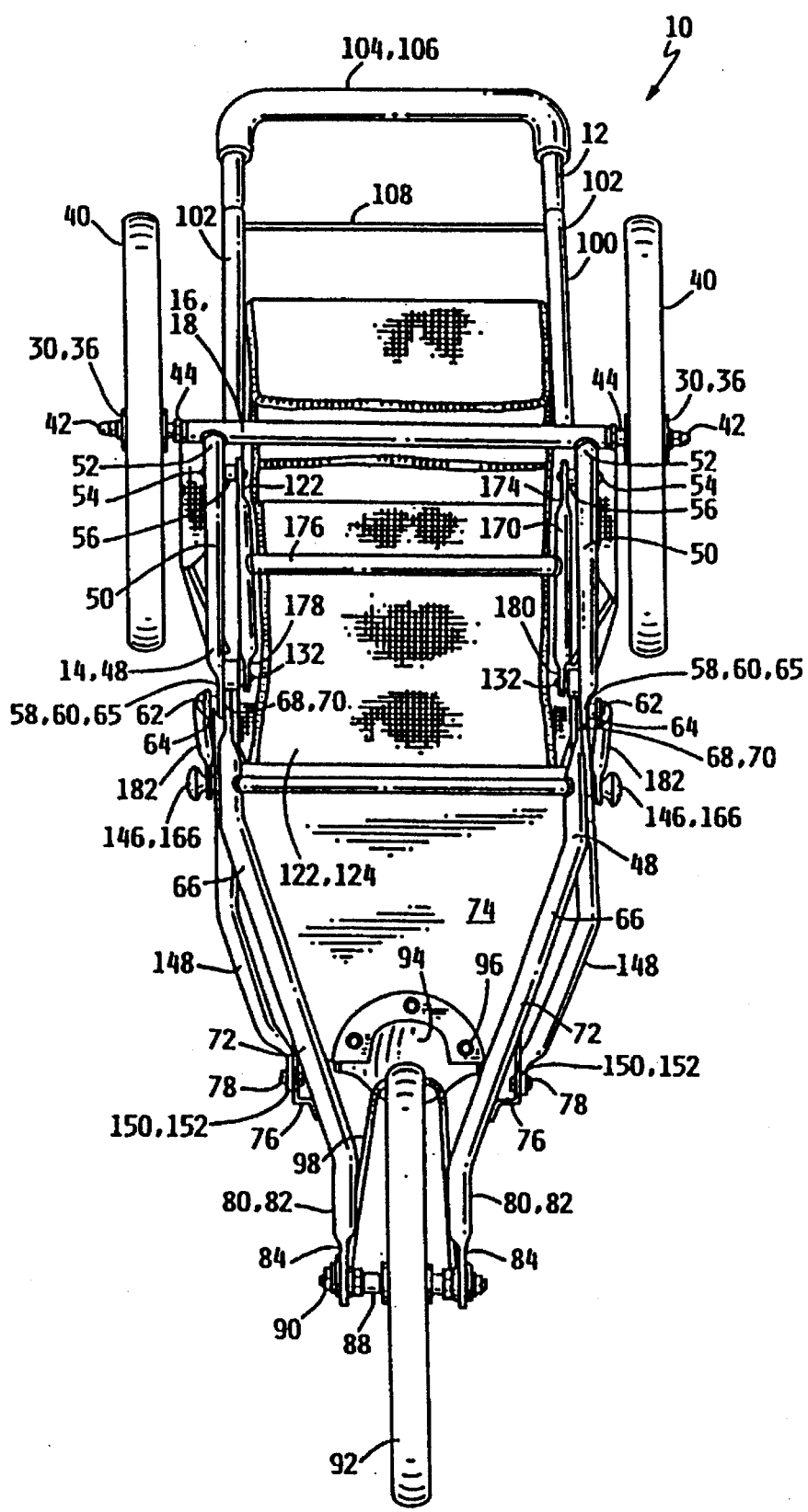
FIG. 3 is a bottom plan view of the infant stroller in its upright condition.
Figure 8:
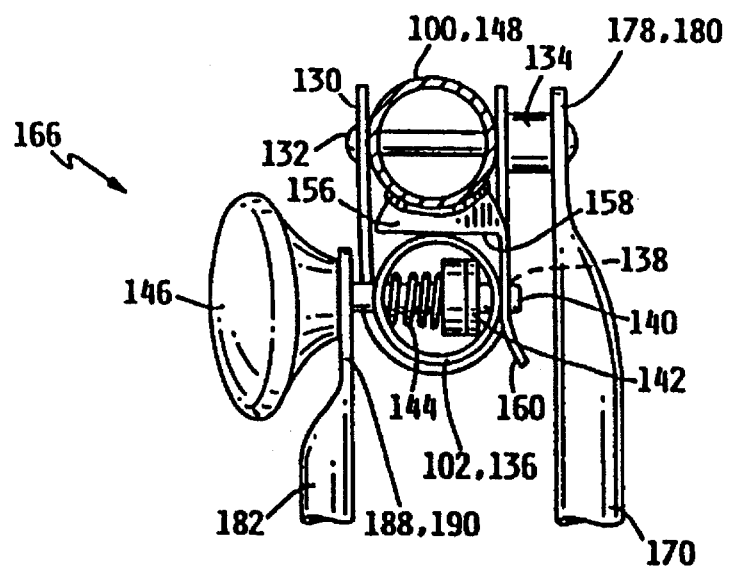
FIG. 8 is an enlarged cross sectional view of the releasable locking means taken along lines 8—8 of FIG. 2.
Figure 4:
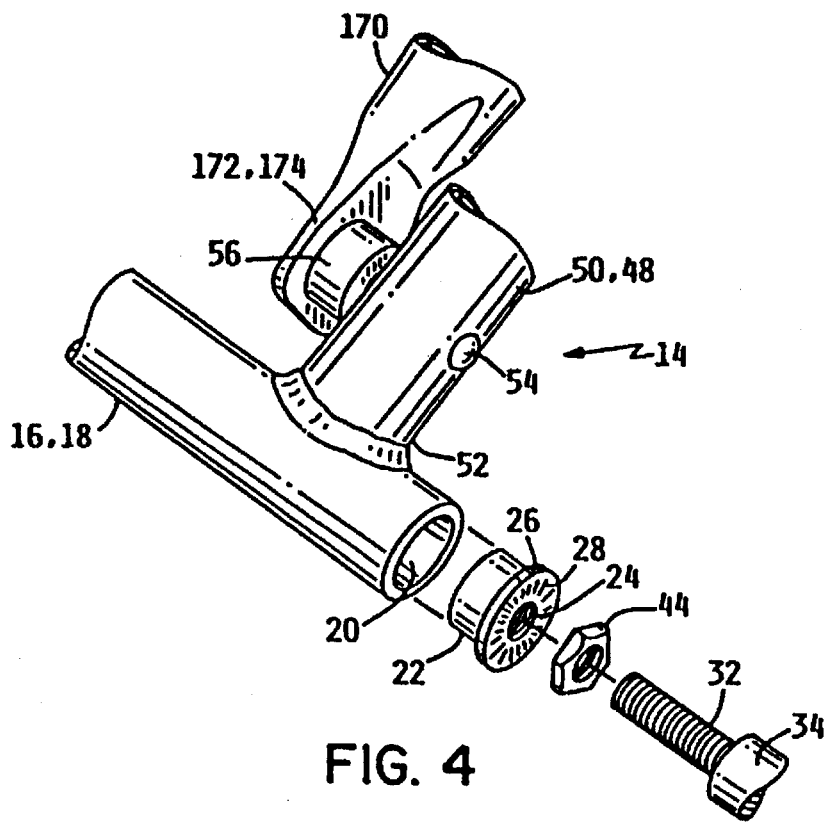
FIG. 4 is an enlarged broken away view of one side of the rear end wherein the other side is its mirror image.
Figure 5:
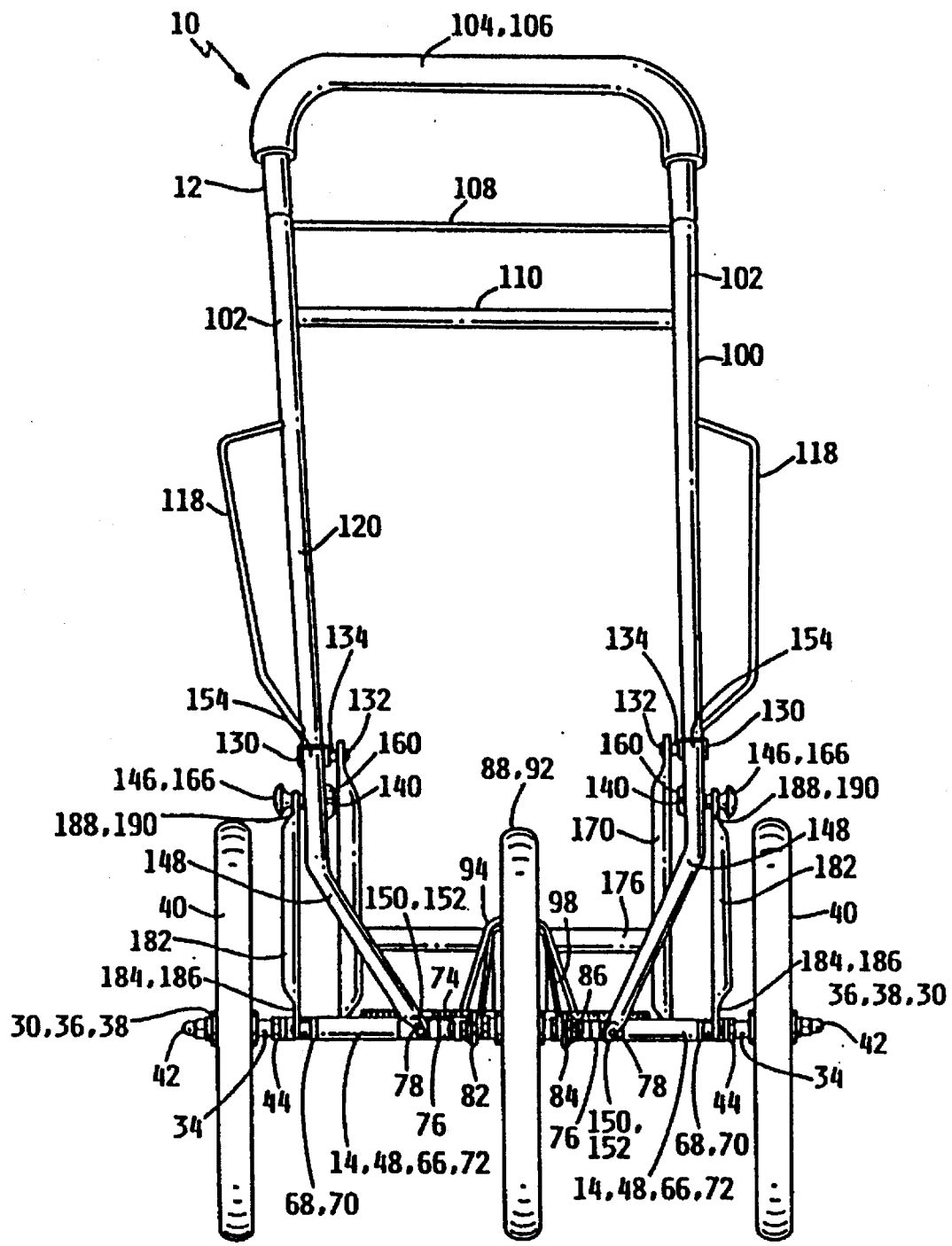
FIG. 5 is a front elevational view of the infant stroller in its upright condition with the flexible infant holder removed for clarity of the stroller's tubular frame.
Figure 6:
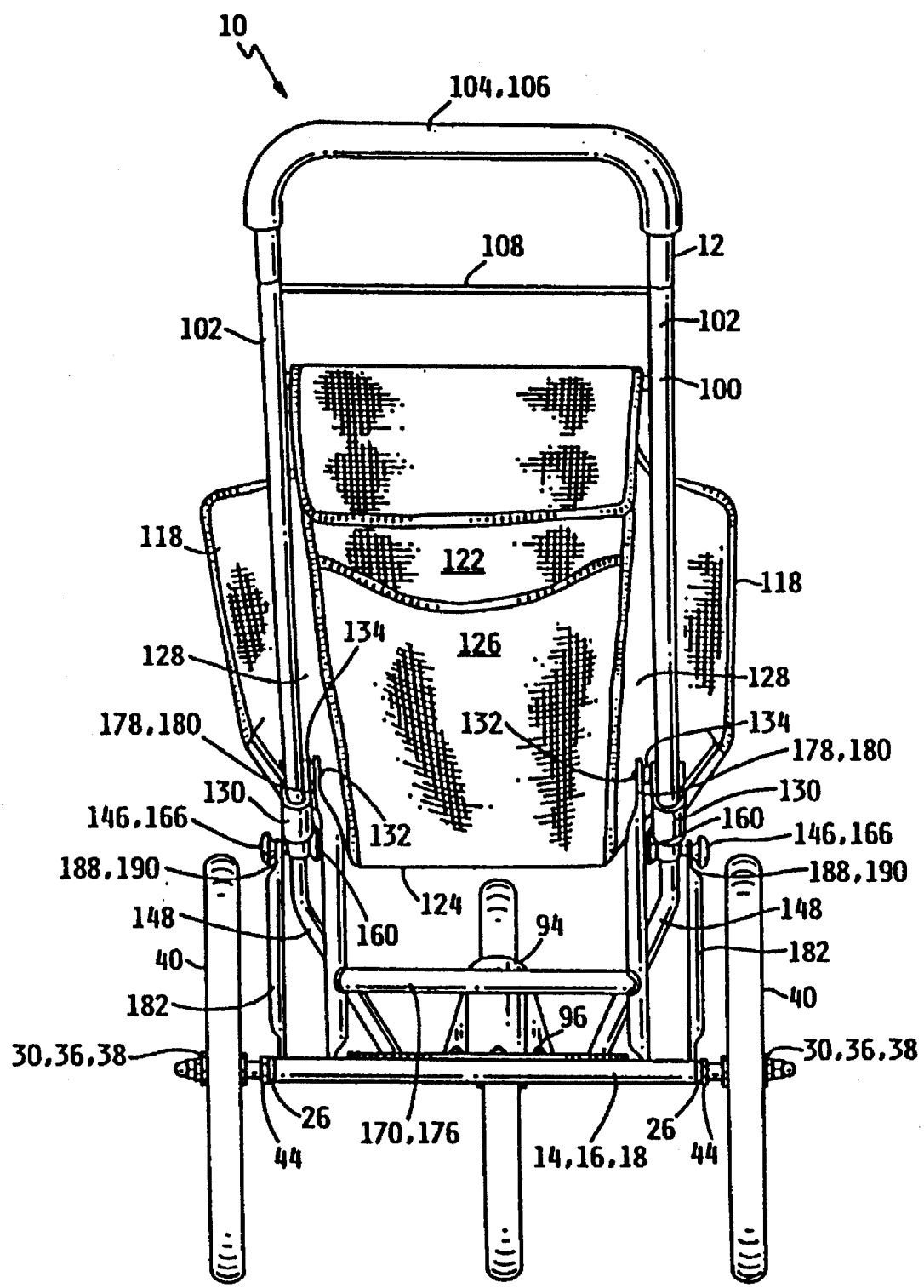
FIG. 6 is a rear elevational view of the infant stroller in its upright condition.
Figure 13:
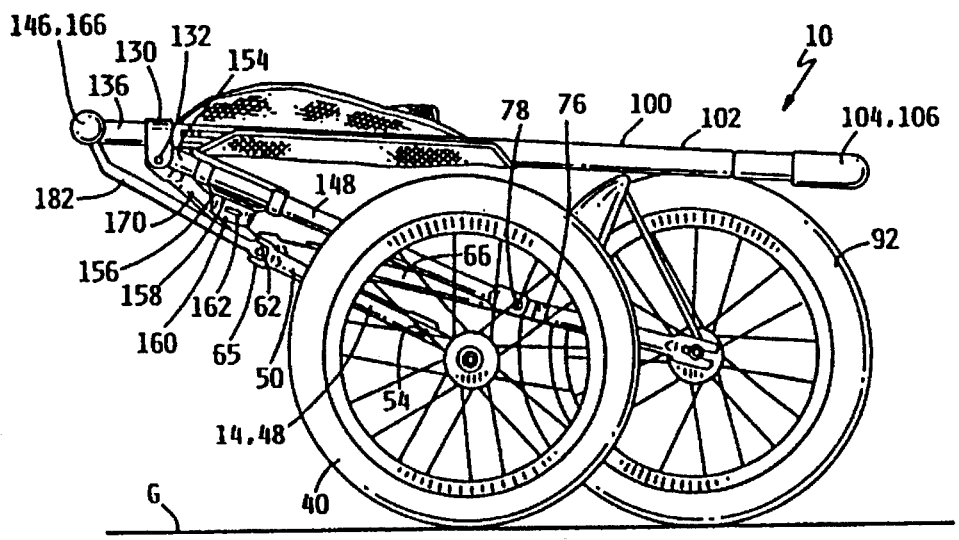
FIG. 13 is a side elevational view of the infant stroller in its fully contracted collapsed condition.
Figure 14:
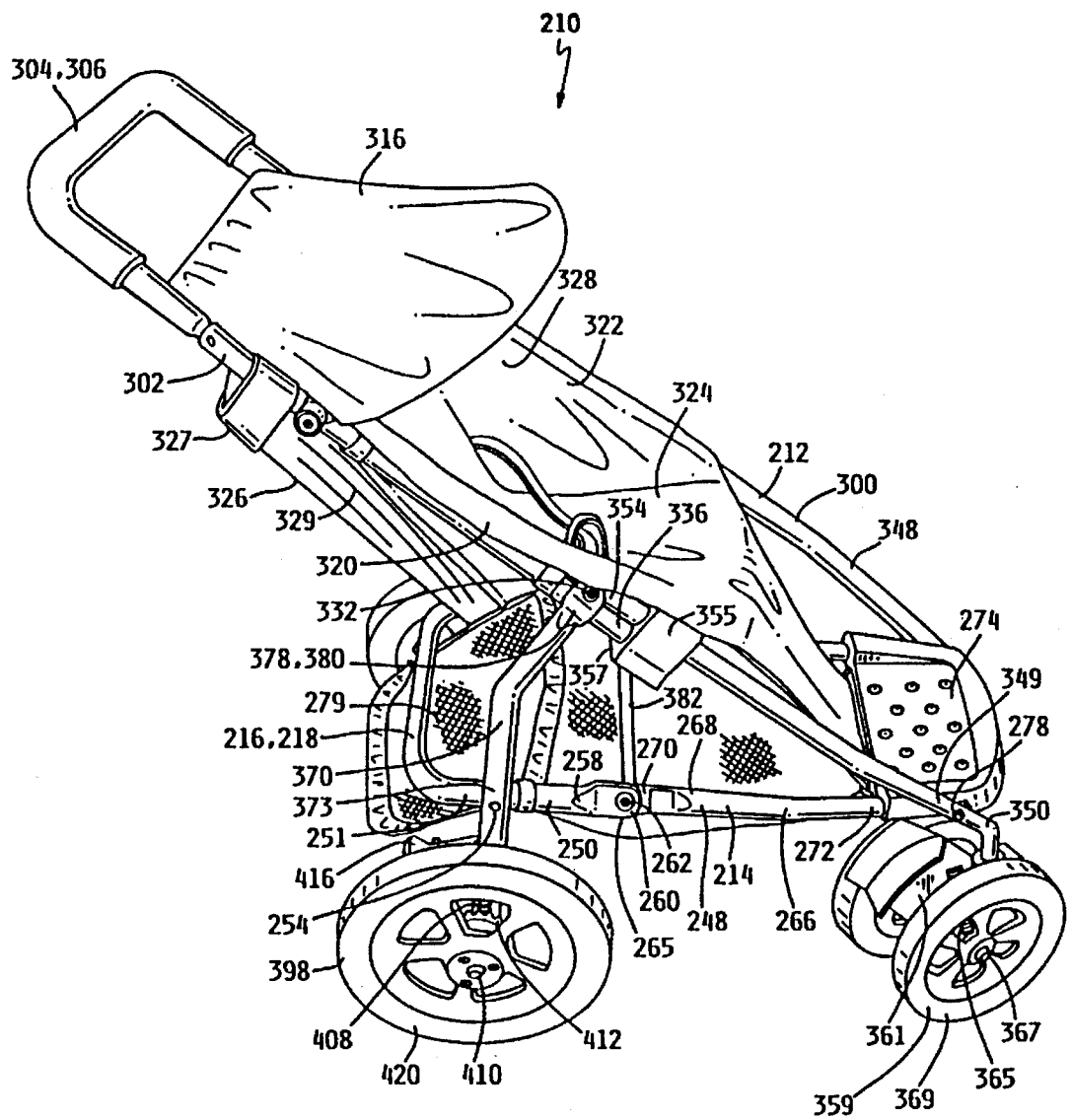
FIG. 14 is a perspective view of the modified collapsible infant stroller of the present invention with its awning assembly extended and seat portion in its upright position.
Figure 15:
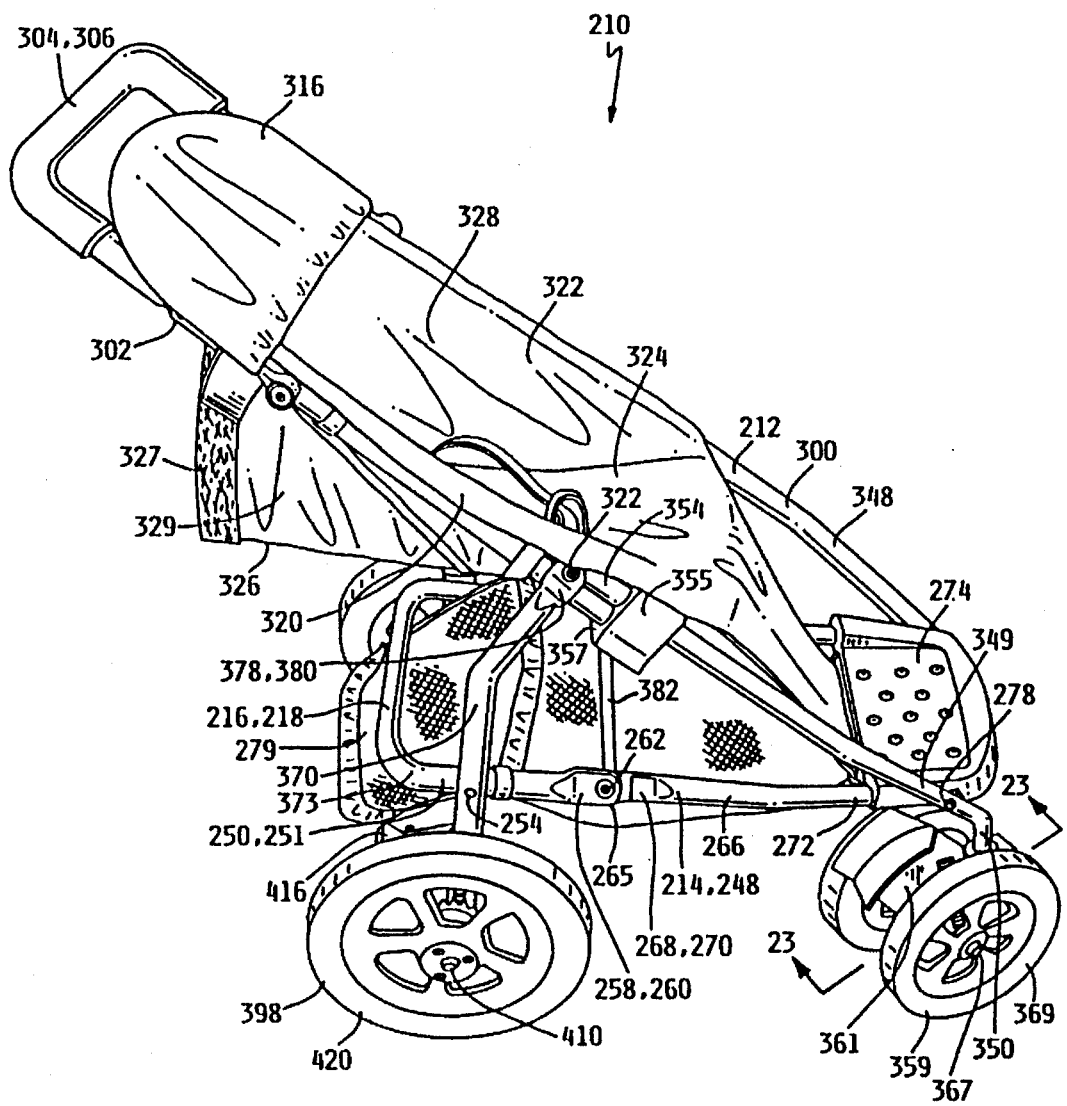
FIG. 15 is also a perspective view of the modified invention with the awning in a folded up position and the adjustable back rest lowered to permit the child to assume a laid back or supine position.
Figure 16:
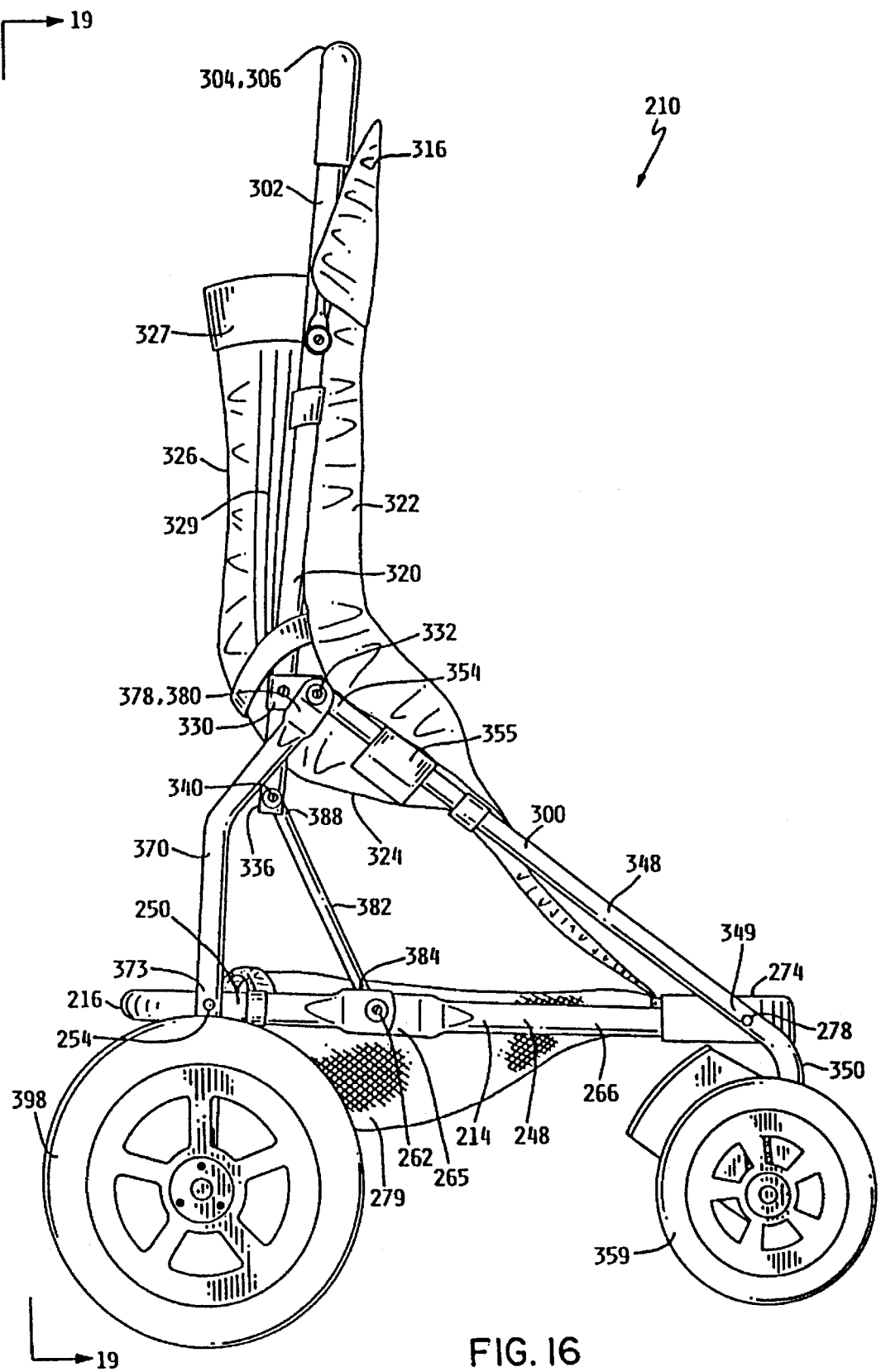
FIG. 16 is a side elevational view of the modified stroller beginning to be folded and collapsed.
Figure 17:
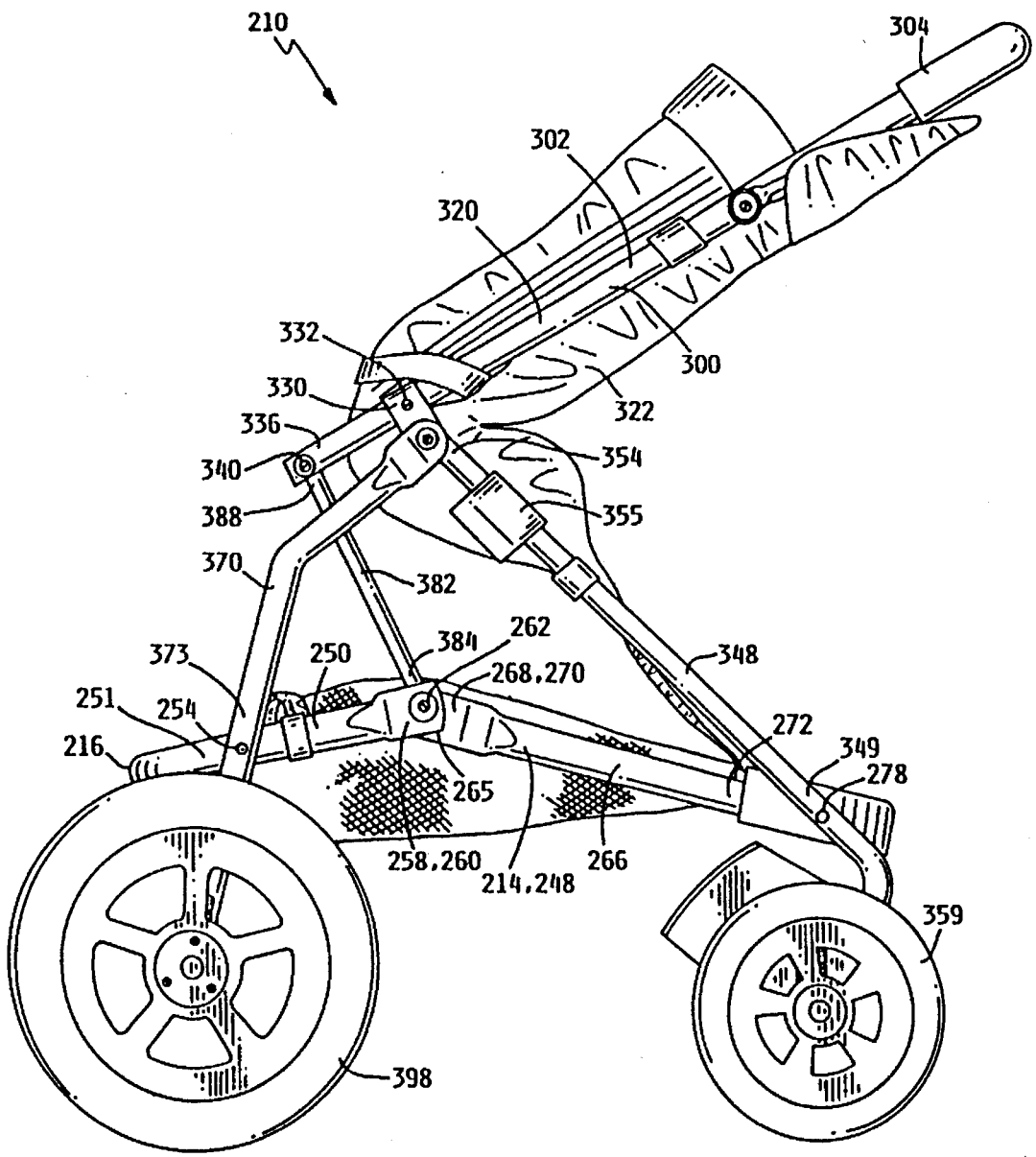
FIG. 17 is a side elevational view of an intermediate position of the modified stroller being collapsed and folded.
Figure 18:
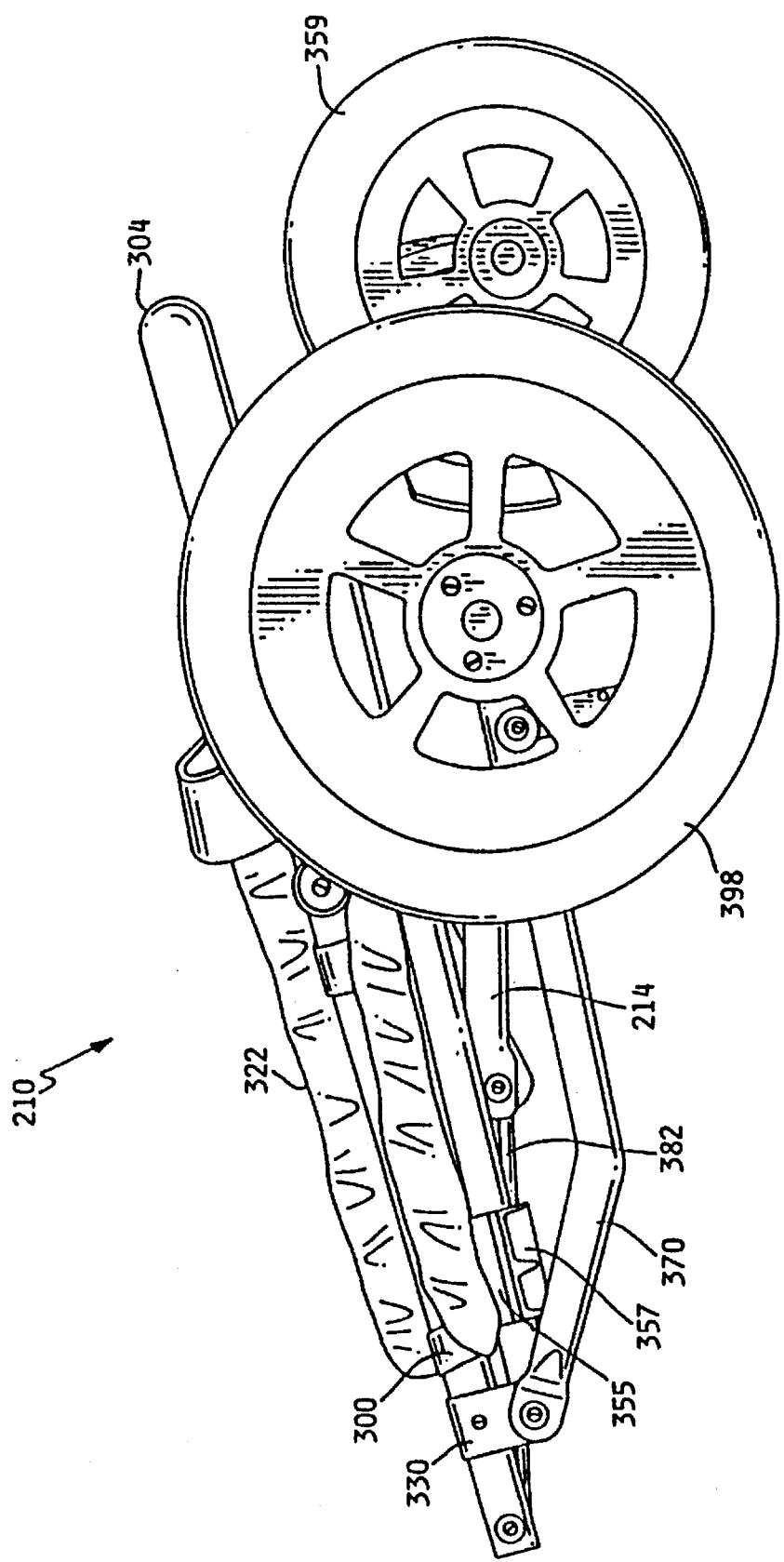
FIG. 18 is a side elevational view of the modified stroller fully folded and collapsed.
Figure 19:
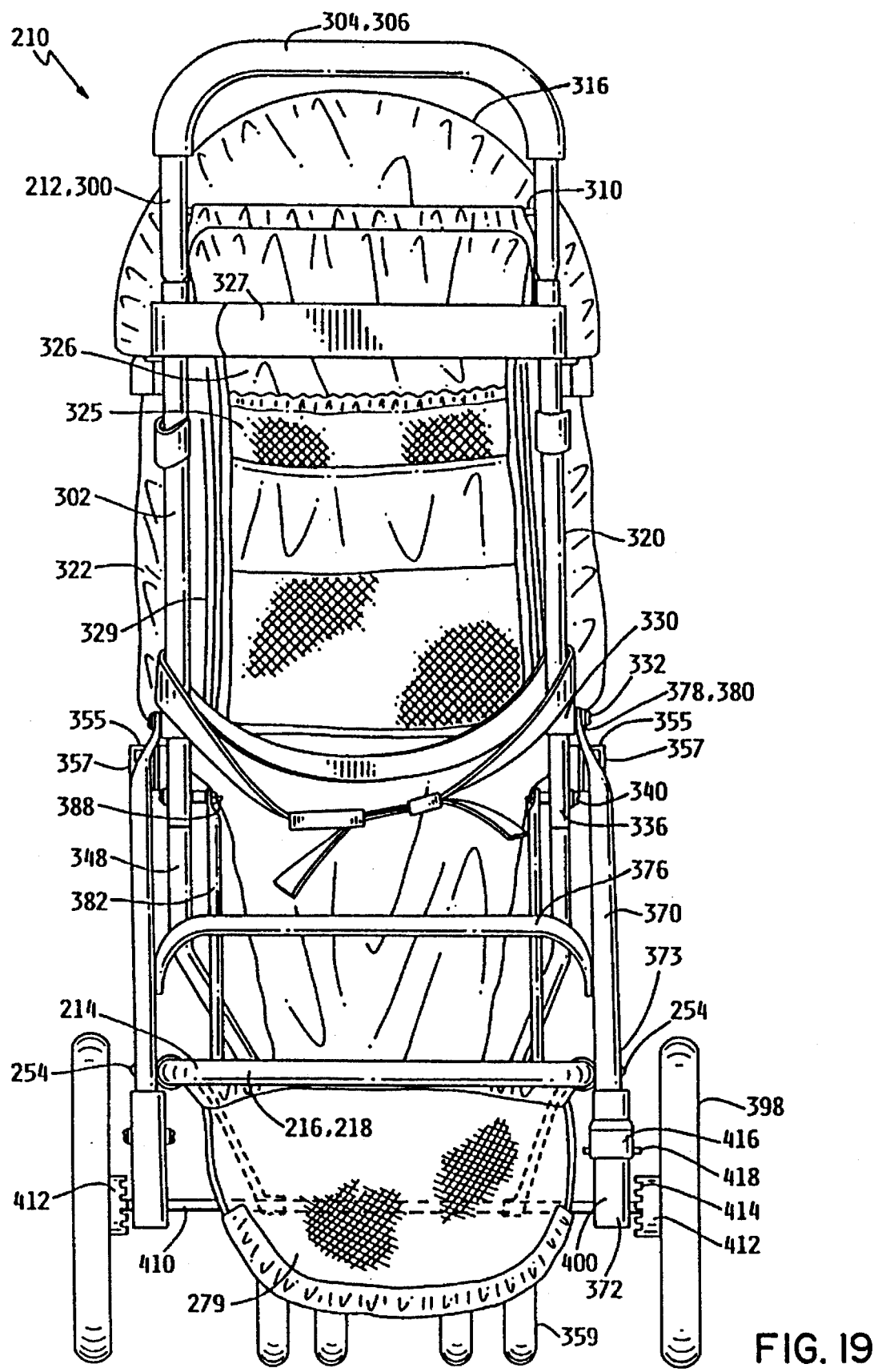
FIG. 19 is a rear elevational view of the modified stroller taken along lines 19—19 of FIG. 16.
Figure 20:
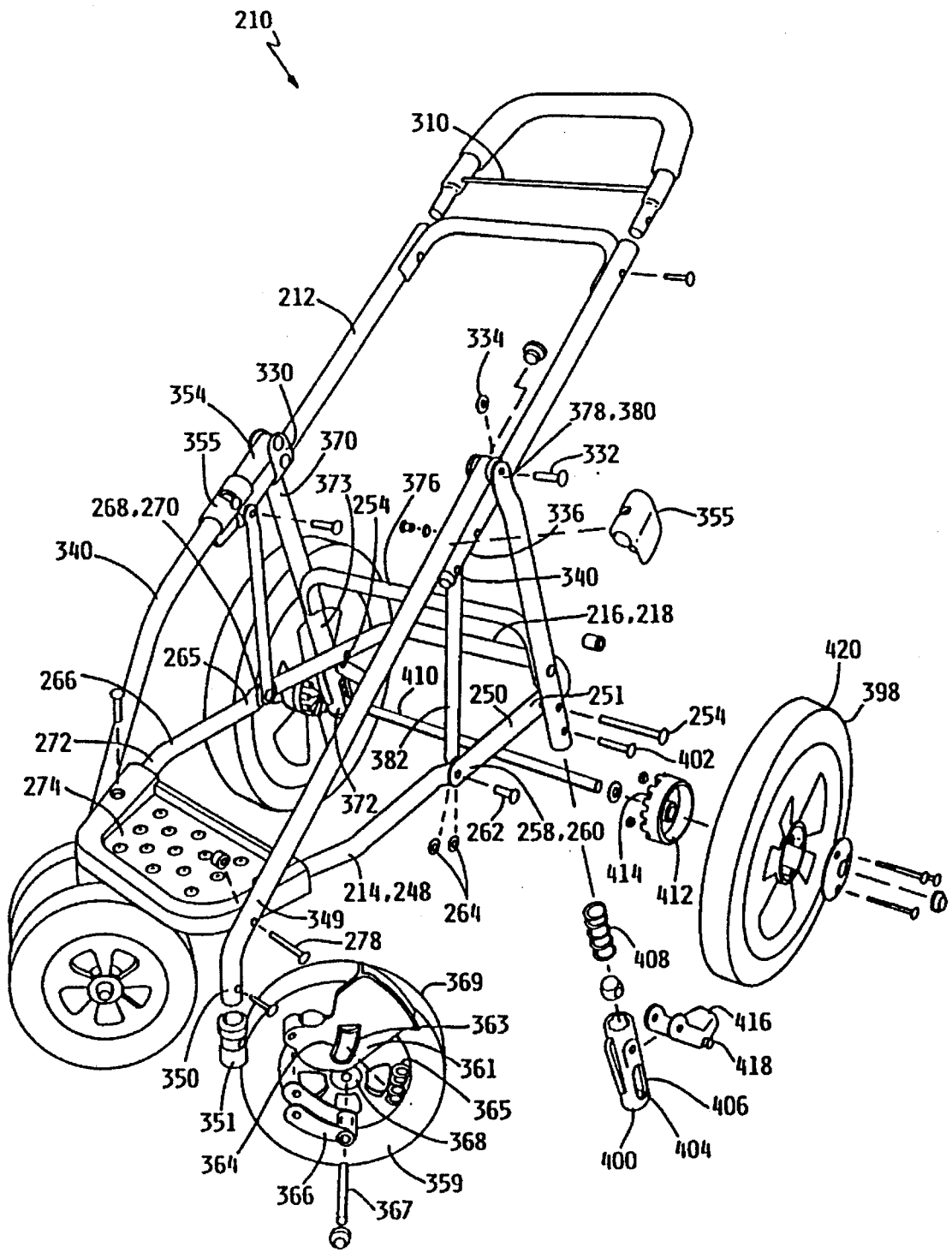
FIG. 20 is a perspective view of the modified stroller frame exploded without the flexible seat portion.
Figure 21:
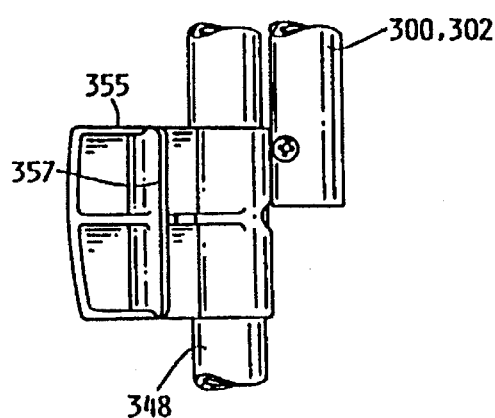
FIG. 21 is a broken away plan view of the releasable locking means of the modified stroller.
Figure 22:
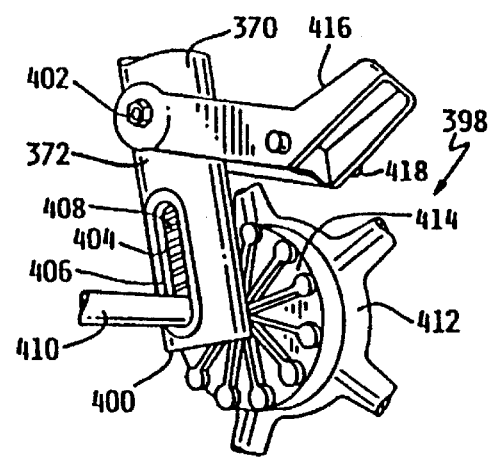
FIG. 22 is a broken away perspective view of the rear wheel assembly.
Figure 23:
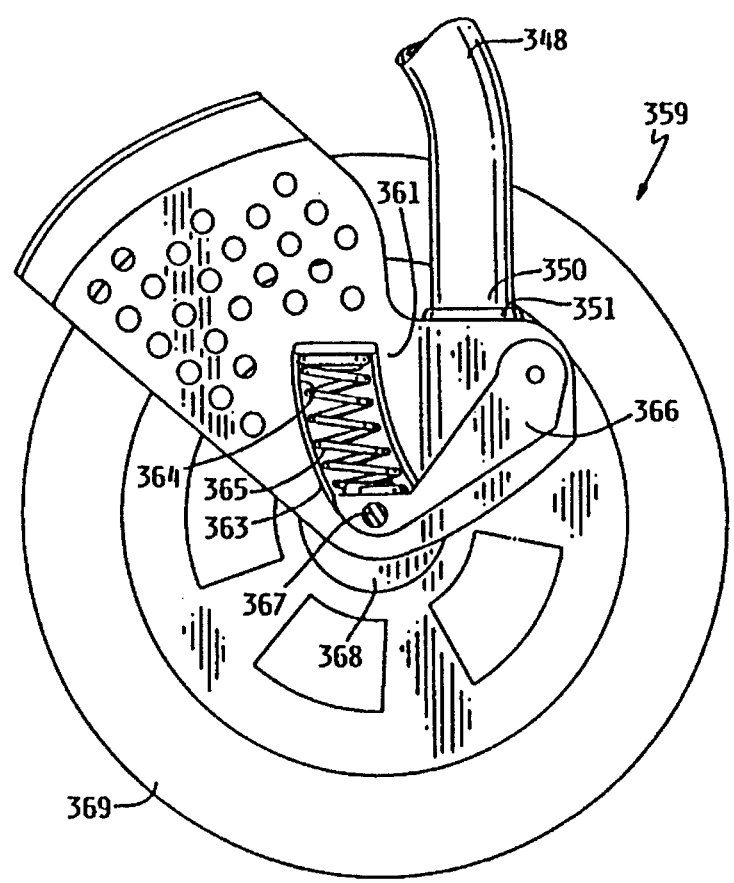
FIG. 23 is a cross sectional view taken along lines 23—23 of FIG. 15.

Referring to FIGS. 2 and 11–13, the erection and contractible collapse of the jogging infant stroller 10 may now be appreciated. FIG. 2 shows the stroller 10 in upright condition with the releasable locking means 166 securely holding the respective links of the upper and lower frame portions 100 and 14 in rigid arrangement. Should the user wish to collapse the stroller 10, handles 146 are pulled outwardly and moved slightly backwardly suitably assisted by the forward lifting of U-shaped handle end 104 as the arrow shows in FIG. 11. As the forward and downward movement of the U-shaped handle end 104 continues, stabilizer struts 182 pull the rear and forward links 50 and 66 of the lower frame portion 14 upwardly as to contract and fold upon each other as the arrows so indicate in FIG. 12. This movement also folds the upper and lower links 102 and 148 of the upper frame portion upon themselves to complete the collapsed condition of the stroller as shown in FIG. 13. As will be appreciated by the comparison of FIGS. 2 and 13, the collapsed stroller is of a shorter height and length than the fully erect stroller which will greatly enhance the storage and transportation of the stroller 10 within spaces previously unknown such as those in smaller automobiles.

It is to be appreciated that the unique collapsible stroller design may lend itself for use with modified versions or embodiments. More specifically, a second embodiment would include the jogging infant stroller 210 which may generally be seen in FIGS. 14–23. The stroller 210 is comprised of a tubular frame 212 having a lower frame portion 214 below which rear wheel assemblies 420 and front wheel assemblies 359 are located. An upper frame portion 300 supports a flexible infant holder 322. The lower and upper frame portions 214 and 300 each have intermediate frame portions 265 and 320 whereat the respective lower and upper frame portions 214 and 300 contract and fold upon themselves. Struts 370 and 382 support the stroller 210 in its upright usable condition and assist in simultaneously contracting the lower and upper frame portions 214 and 300 with the release of the locking means 355 and movement of the handle end 304 forwardly and downwardly.

Specifically referring to FIGS. 14–20, the contractible lower frame portion 214, which is substantially parallel and elevated with respect to the ground, will be appreciated. The rear end 216 of the lower frame portion 214 comprises a cross member 218. Extending forwardly from the rear end 216 are contractible side rails or legs 248 of the lower frame portion 214. Side rails 248 are comprised of rear links 250 which extend forwardly from the rear end 216. Each rear opposing link 250 joins rear end 216. Just forward of the rear end 216 is located an intermediate portion 251 which supports a pivot pin, rivet or the like 254. Rear link 250 also has a forward end 258 which is flattened to form a tongue, tab or ear 260 with an aperture therethrough. Pivot pin, rivet, bolt or the like 262 extends through the aperture of tongue 260 and supports optionally a nylon washer 264 to assist in folding of the stroller 210. This area is considered the intermediate lower frame portion 265.

The contractible lower frame portion 214 also is comprised of opposing forward links 266 each of which has a flattened rear end 268 forming a tongue, tab or ear 270 with an aperture therethrough pivotally captured by pin 262 whereat the rear links 250 and forward links 266 are pivotally joined. Forward links 266 each have forward ends 272 and appropriately support a step plate 274 suitably by screws or the like fastening the plate 274 to the forward portion of links 266. Suitably the step plate 274 has a nonslip surface such as by coating, corrugation or dimpling. As the forward ends 272 converge, each supports a pivot pin, rivet or the like 278 therethrough.

Referring to the contractible upper frame portion 300 of the collapsible infant stroller 210, the upper frame portion 300 is generally of an inverted U-shape. It is comprised of upper links 302 and a U-shaped handle end 304 which appropriately supports a foam rubber-like grip 306. The upper links 302 extend downwardly and forwardly when the stroller 210 is in its upright condition. The upper links 302 may support the previously disclosed awning and canopy assembly 316. A cross connecting seat bar 310 is also appropriately fastened between upper links 302 for supporting the flexible seat portion 324.

More specifically, the intermediate seat portion 320 and the cross connecting seat bar 310 support the flexible holder 322 appropriately by VELCRO® straps therearound. Flexible infant holder 322 has a seat 324, a rear mesh pocket 325 connected to a back rest 326. The top portion of back rest 326 has affixed thereto adjustment straps with hook and loop material (VELCRO®) fixed there along for securement about the upper links 302. The infant holder 322 also has a sidewall 328 that is expandable by way of the sidewall gussets or folded portions 329. By this arrangement, the back rest 326 of the flexible infant holder 322 may be adjusted from a range of a lay down position in FIG. 15 to an upright sitting position shown in FIG. 14.

At the intermediate seat portions 320 of the upper links 302 is located a lower link pivot mounting bracket 330 suitably supporting a pivot pin or rivet 322 capturing a nylon washer 334. The lower end 336 of upper links 302 also have a pivot pin 340 therethrough as will be appreciated. Lower links 348 of the contractible upper frame portion 300 also suitably have an intermediate portion 349 above the lower end 350 for receipt of the forward pivot pin 278. At the lower end 350 is secured a coupler 351 for attachment to the front wheel assembly 359 on each lower link 348. The upper ends 354 of the lower links 348 are for connection to pivot pin 332. The releasable locking means is affixed to the region of the upper end 354 and suitably has a catch 357 for hand actuation for capturing the upper link 302 as it lays upon the lower link 348. It will be appreciated that a release of the locking means 355 will permit pivoting of the upper links 302 and lower links 348 at pivot pin 332 for collapse and folding of the stroller 210.

At the lower ends 350 of the lower links 330 are front wheel assemblies 359 each which rotate about a vertical axis. Each wheel assembly 359 has a suspension frame 361 including a suspension axle housing 363 with slots 364 therethrough. Housing 363 captures a spring 365 and axle 367 supported by an axle frame link 366 which pivots on the suspension frame 361 as shown. Axle 367 passes through wheel hubs 368 of each wheel 369 illustratively being approximately 9" in diameter. Fenders are also optional.

Rear struts 370 each have lower ends 372 which support rear wheel assemblies 398 below the elevated lower frame portion 214 as will be appreciated. Rear struts 370 also have an intermediate portion 372 which captures the pivot pin 254 to assist in the collapse and folding of stroller 210. Rear struts 370 also have a cross member 376 for rigidity. The upper ends 378 of the rear struts 70 also have tongues 380 with an aperture therethrough for securement and capture to pivot pins 332 connected to the upper ends 354 of the lower links 348.

Frame stabilizer struts 82 are also provided for interconnecting the upper frame portion 300 and the lower frame portion 214. Stabilizer struts 382 each have a lower end 384 with a tongue and an aperture therethrough for connection to the intermediate portion 251 of the lower frame 214 appropriately at pivot pin 262. Struts 382 also each have an upper end 388 with a tongue and aperture thereat for connection to the intermediate seat portion 320 of the upper frame 300 appropriately at pivot pin 340.

The rear wheel assemblies 398 appropriately has two suspension frames 400 for each wheel 420. Each frame 400 is secured to the lower ends 372 of the rear struts 370 and held thereat by securing pin 402. The frames 400 each have a suspension axle housing 404 with slots 406 therethrough. Housing 404 captures spring 408 while axle 410 extends through slots 406 below spring 408 for connection to wheel hubs 412. The inside face of hubs 412 each have slots, knobs or ratcheting 414 for interlocking relationship with the tabs or fingers 418 of foot brake 416 which is secured to the rear strut 370 suitably by pin 402. As will be appreciated, foot brake 416 may be lifted upwardly to disengage the brake or pushed downwardly with the foot to engage the brake when the stroller 210 is unattended. Wheel hubs 412 support wheels 420 illustratively being approximately 12" in diameter.

The collapsing and folding of this modified stroller 210 is the same as the previous infant stroller 10. However, this modified stroller provides the benefit of an infinitely adjustable flexible infant holder 322, together with suspension frames 400 and 361 which support the wheels 369 and 420.

By this arrangement, this modified multi-purpose invention provides the user the option of conventional strollering without the appearance of a jogging stroller while yet permitting its use over rough terrain or further for jogging.

The present invention may be embodied in other specific forms without departing from the spirit of essential attributes thereof; therefore, the illustrated embodiment should be considered in all respects as illustrative and not restrictive, reference being made to the appended claims rather than to the foregoing description to indicate the scope of the invention.

What is claimed:

1. A conveniently transportable, collapsible infant stroller for safely and smoothly carrying an infant at walking speed, over rough terrain and at a relatively higher speed than the normal average walking speed of approximately 3–4 miles per hour, comprising:

(a) an elevated contractible lower frame portion having a rear end, an intermediate portion and a front end;

(b) a contractible upper frame portion having an upper handle end, an intermediate seat portion supporting a flexible infant holder and a lower end pivotally attached to the lower frame portion and extending downwardly therefrom and supporting a front wheel assembly;

(c) a stabilizer strut connected to the lower frame portion and the upper frame portion;

(d) a rear strut pivotally connected to the upper frame portion and lower frame portion and extending downwardly from the lower frame portion and supporting two rear wheel assemblies thereat; and (e) a releasable locking means adapted to secure the stroller in an upright erect condition for use and when released to permit contraction of the upper and the lower frame portions inwardly upon themselves as to move the stroller to a collapsed and contracted condition for transportation and storage, wherein the stroller is converted from its erect condition to its collapsed condition by releasing the locking mean and moving the upper handle end forwardly and downwardly.

2. The stroller of claim 1, wherein the contractible lower frame portion has a pair of opposing rear links extending forwardly of the rear end and each rear link forming a pivotal connection to one of a pair of opposing forward links which form the front end.

3. The stroller of claim 2, wherein the stabilizer strut pivotally extends upwardly from the pivotal connection of one pair of the forward and the rear links wherein the stabilizer strut holds the forward; and the rear links substantially horizontal to the ground and alternatively will lift the forward and the rear links to fold upon each other to contract the lower frame portion.

4. The stroller of claim 1, wherein the contractible upper frame portion has a pair of opposing upper links extending downwardly and forwardly from the handle end and each upper link being pivotally connected to one, of a pair of opposing lower links which are pivotally attached to the lower frame portion.

5. The stroller of claim 4, wherein the upper links and the lower links partially overlap with each other.

6. The stroller of claim 5, wherein the releasable locking means is connected to an upper end of one of the lower links and secures and releases the partial overlap of one pair of the upper and the lower links.

7. The stroller of claim 5, wherein the releasable locking means comprises the pivotal connection between one pair of upper and lower links and a catch which secures the partial upper and lower link overlap.

8. The stroller of claim 1, wherein the tipper frame portion supports a rotatable awning bracket, awning frame and flexible awning.

9. The stroller of claim 1, wherein the stabilizer strut is pivotally connected to the intermediate portion of the lower frame portion as to inwardly move and contract the lower frame portion into the collapsed condition when the locking means is released and the upper frame portion is contracted and collapsed.

10. The stroller of claim 1, wherein the flexible infant holder has a seat portion, opposing expandable sidewalls and an adjustable backrest to permit the infant to assume a sitting, lying down or therebetween posture.

11. The stroller of claim 1, wherein the wheel assemblies support a four position wheel base.

12. The stroller of claim 1, wherein each wheel assembly has spring suspension.

13. The stroller of claim 1, wherein the front wheel assembly rotates about a vertical axis.

14. The stroller of claim 1, wherein the lower end of the contractible upper frame portion supports two front wheel assemblies, each having two wheels.

15. The stroller of claim 1, wherein the flexible infant holder and lower frame portion support pockets.

16. A conveniently transportable, collapsible infant stroller for safely and smoothly carrying an infant at walking speed, over rough terrain and at a relatively higher speed than the normal average walking speed of approximately 3–4 miles per hour, comprising:

(a) an elevated contractible lower frame portion having a rear end, an intermediate portion and a front end;

(b) a contractible upper frame portion having an upper handle end, an intermediate seat portion supporting a flexible infant holder with a seat portion, opposing expandable sidewalls and an adjustable backrest to permit the infant to assume a sitting, lying down or therebetween posture and the upper frame portion having a lower end pivotally attached to the lower frame portion and extending downwardly therefrom and supporting a front: wheel assembly;

(c) a stabilizer strut connected to the lower frame portion and the upper frame portion;

(d) a rear strut pivotally connected to the upper frame portion and lower frame portion and extending downwardly from the lower frame portion and supporting two rear wheel assemblies thereat; and (e) a releasable locking means adapted to secure the stroller in an upright erect condition for use and when released to permit contraction of the upper and the lower frame portions inwardly upon themselves as to move the stroller to a collapsed and contracted condition for transportation and storage, wherein the stabilizer strut is pivotally connected to the intermediate portion of the lower frame portion as to inwardly move and contract the lower frame portion into the collapsed condition when the locking means is released and the upper frame portion is contracted and collapsed.

17. The stroller of claim 16, wherein the contractible lower frame portion has a pair of opposing rear links extending forwardly of the rear end and each rear link forming a pivotal connection to one of a pair of opposing forward links which form the front end.

18. The stroller of claim 17, wherein the stabilizer strut pivotally extends upwardly from the pivotal connection of one pair of the forward and the rear links wherein the stabilizer strut holds the forward and the rear links substantially horizontal to the ground and alternatively will lift the forward and the rear links to fold upon each other to contract the lower frame portion.

19. The stroller of claim 16, wherein the contractible upper frame portion has a pair of opposing upper links extending downwardly and forwardly from the handle end and each upper link being pivotally connected to one of a pair of opposing lower links which are pivotally attached to the lower frame portion.

20. The stroller of claim 19, wherein the upper links and the lower links partially overlap with each other.

21. The stroller of claim 20, wherein the releasable locking means is connected to an upper end of one of the lower links and secures and releases the partial overlap of one pair of the upper and the lower links.

22. The stroller of claim 20, wherein the releasable locking means comprises the pivotal connection between one pair of upper and lower links and a catch which secures the partial upper and lower link overlap.

23. The stroller of claim 16, wherein the upper frame portion supports a rotatable awning bracket, awning frame and flexible awning.

24. The stroller of claim 16, wherein the stroller is converted from its erect condition to its collapsed condition by releasing the locking means and moving the upper handle end forwardly and downwardly.

25. The stroller of claim 16, wherein the wheel assemblies support a four position wheel base.

26. The stroller of claim 16, wherein each wheel assembly has spring suspension.

27. The stroller of claim 16, wherein the front wheel assembly rotates about a vertical axis.

28. The stroller of claim 16, wherein the lower end of the contractible upper frame portion supports two front wheel assemblies, each having two wheels.

29. The stroller of claim 16, wherein the flexible infant holder and lower frame portion support pockets.

30. A conveniently transportable, collapsible infant stroller for safely and smoothly carrying an infant at walking speed, over rough terrain and at a relatively higher speed than the normal average walking speed of approximately 3–4 miles per hour, comprising:

(a) an elevated contractible lower frame portion having a rear end, an intermediate portion and a front end, wherein the contractible lower frame portion has a pair of opposing rear links extending forwardly of the rear end and each rear link forming a pivotal connection to one of a pair of opposing forward links which form the front end;

(b) a contractible upper frame portion having an upper handle end, an intermediate seat portion supporting a flexible infant holder with a seat portion, opposing expandable sidewalls and an adjustable backrest to permit the infant to assume a sitting, lying down or therebetween posture and the upper frame portion having a lower end pivotally attached to the lower frame portion and extending downwardly therefrom and supporting a front wheel assembly, and wherein the contractible upper frame portion has a pair of opposing upper links extending downwardly and forwardly from the handle end and each upper link being pivotally connected to one of a pair of opposing lower links which are pivotally attached to the lower frame portion;

(c) a stabilizer strut connected to the lower frame portion and the upper frame portion extending upwardly from the pivotal connection of one pair of the forward and the rear links wherein the stabilizer strut holds the forward and the rear links substantially horizontal to the ground and alternatively will lift the forward and the rear links to fold upon each other to contract the lower frame portion;

(d) a rear strut pivotally connected to the upper frame portion and lower frame portion and extending downwardly from the lower frame portion and supporting two rear wheel assemblies thereat; and (e) a releasable locking means adapted to secure the stroller in an upright erect condition for use and when released to permit contraction of the upper and the lower frame portions inwardly upon themselves as to move the stroller to a collapsed and contracted condition for transportation and storage, wherein the stabilizer strut is pivotally connected to the intermediate portion of the lower frame portion as to inwardly move and contract the lower frame portion into the collapsed condition when the locking means is released and the upper frame portion is contracted and collapsed.

31. The stroller of claim 30, wherein the upper links and the lower links partially overlap with each other.

32. The stroller of claim 31, wherein the releasable locking means is connected to an upper end of one of the lower links and secures and releases the partial overlap of one pair of the upper and the lower links.

33. The stroller of claim 31, wherein the releasable locking means comprises the pivotal connection between one pair of upper and lower links and a catch which secures the partial upper and lower link overlap.

34. The stroller of claim 30, wherein the upper frame portion supports a rotatable awning bracket, awning frame and flexible awning.

35. The stroller of claim 30, wherein the stroller is converted from its erect condition to its collapsed condition by releasing the locking means and moving the upper handle end forwardly and downwardly.

36. The stroller of claim 30, wherein the wheel assemblies support a four position wheel base.

37. The stroller of claim 30, wherein each wheel assembly has spring suspension.

38. The stroller of claim 30, wherein the front wheel assembly rotates about a vertical axis.

39. The stroller of claim 30, wherein the lower end of the contractible upper frame portion supports two front wheel assemblies, each having two wheels.

40. The stroller of claim 30, wherein the flexible infant holder and lower frame portion support pockets.

* * * * *

UNITED STATES PATENT AND TRADEMARK OFFICE
CERTIFICATE OF CORRECTION

PATENT NO. : 5,522,614
DATED : June 4, 1996
INVENTOR(S) : David N. Eyman, Thomas J. Schmidlin, Jennifer A. Kelley It is certified that error appears in the above-indentified patent and that said Letters Patent is hereby corrected as shown below:

On the Title page, "[63] Continuation-in-part of Ser. No. 30,703, Mar. 12, 1993, Pat. No. 3,356,171." should read -- [63] Continuation-in-part of Ser. No. 30,703, Mar. 12, 1993, Pat. No. 5,356,171. --

Claim 8, column 10, line 19, "tipper" should be -- upper --.

Signed and Sealed this

Twenty-fourth Day of September, 1996

Attest:

BRUCE LEHMAN

*Attesting Officer*      *Commissioner of Patents and Trademarks*